US012330270B2

(12) United States Patent
Turley

(10) Patent No.: US 12,330,270 B2
(45) Date of Patent: Jun. 17, 2025

(54) CENTERING DEVICE

(71) Applicant: WOODPECKERS, LLC, Strongsville, OH (US)

(72) Inventor: Paul E. Turley, Amherst, OH (US)

(73) Assignee: Woodpeckers, LLC, Strongsville, OH (US)

(*) Notice: Subject to any disclaimer, the term of this patent is extended or adjusted under 35 U.S.C. 154(b) by 427 days.

(21) Appl. No.: 17/696,041

(22) Filed: Mar. 16, 2022

(65) Prior Publication Data

US 2023/0294248 A1 Sep. 21, 2023

(51) Int. Cl.

| | |
|---|---|
| ***B25B 1/00*** | (2006.01) |
| ***B25B 1/02*** | (2006.01) |
| ***B25B 1/10*** | (2006.01) |

(52) U.S. Cl.
CPC . *B25B 1/10* (2013.01); *B25B 1/02* (2013.01)

(58) Field of Classification Search
CPC .. B25B 1/10; B25B 1/103; B25B 1/02; B25B 1/06; B25B 1/08; B25J 15/026
USPC ....... 269/240, 246, 243, 244, 234, 227, 216, 269/221, 181, 173, 165, 92, 104, 107, 269/110, 113, 177, 182, 184, 60, 120, 269/118, 132, 153, 211, 212, 186, 218, 269/222, 225
See application file for complete search history.

(56) References Cited

U.S. PATENT DOCUMENTS 1,799,474 A * 4/1931 McChesney ............ B25B 1/125 269/146
4,981,400 A 1/1991 Stover
5,782,006 A 7/1998 Erway et al.
5,860,197 A 1/1999 Fox
7,147,412 B2 12/2006 Davis
7,762,749 B2 7/2010 Kiezel
(Continued)

FOREIGN PATENT DOCUMENTS

DE 102015012779 A1 * 4/2017 ............ B23Q 17/00
DE 102016004924 A1 * 10/2017
(Continued)

OTHER PUBLICATIONS

Machine Translation DE_102015012779_A1 (Year: 2017).*
(Continued)

*Primary Examiner* — Lee D Wilson

(74) *Attorney, Agent, or Firm* — Sand, Sebolt & Wernow Co., LPA

(57) ABSTRACT

A centering device comprises a base, a first jaw assembly operably engaged with the base, and a second jaw assembly operably engaged with the base. The first jaw assembly is configured to move longitudinally along the base, and the second jaw assembly is also configured to move longitudinally along the base. The centering device also includes an actuation assembly that operably engages with the base, the first jaw assembly, and the second jaw assembly. The centering device also includes a drive assembly operably engaged with the first jaw assembly. The drive assembly is operable to move the first jaw assembly longitudinally along the base. The movement of the first jaw assembly longitudinally along the base activates the actuation assembly, and the second jaw assembly is caused to move longitudinally along the base via the actuation assembly.

24 Claims, 17 Drawing Sheets

(56) References Cited

U.S. PATENT DOCUMENTS

| | | | |
|---|---|---|---|
| 9,364,902 B1 | 6/2016 | Ruggiero | |
| 9,370,828 B2 | 6/2016 | Adkins et al. | |
| 2001/0036389 A1 | 11/2001 | Park | |
| 2019/0358715 A1 | 11/2019 | Yu | |

FOREIGN PATENT DOCUMENTS

| | | |
|---|---|---|
| GB | 2132516 | 7/1984 |
| KR | 20180002814 U | 10/2018 |

OTHER PUBLICATIONS

Machine Translation DE_102016004924 (Year: 2017).*
Penn Tool Co.; www.penntoolco.com; Copyright 2022 Penn Tool Co., Inc.; 5 Pages.
Lee Valley Home; Self-Centering Pen Drilling Vise; 1 page.
Raptor Woodworking Products; https://raptorworkholding.com; 2021 Copyright Raptor Workholding; 2 Pages.
Rockler; Rockler Self-Centering Drill Vise; 5 Pages.
Penn Tool Co.; www.penntoolco.com; Copyright 2022 Penn Tool Co., Inc.; Vertex; 3 Pages.

* cited by examiner

CENTERING DEVICE

TECHNICAL FIELD

The present disclosure generally relates to a multipurpose tool. More particularly, the present disclosure relates to a portable self-centering device. Specifically, the present disclosure relates to a portable self-centering device that is useable to enable a woodworker to quickly center a workpiece in first and second configurations.

BACKGROUND

Machine vises, bench vises, and other similar mechanical apparatuses of the like are used in various projects for gripping and securing an object (such as a workpiece) to itself for allowing work to be performed on it. Conventional vises, as listed above, have two parallel jaws where one jaw is fixed and immovable, and the other jaw is moveable relative to the fixed jaw. Generally, the moveable jaw in these types of vises are usually moveable by a screw mechanism where a screw linearly moves the moveable jaw towards and away from the fixed jaw upon loosening or tightening the screw. However, these conventional vises cause issues where the woodworker must readjust and/or reorient a drilling or boring device when drilling or boring center holes in various types of workpiece that have different sizes, shapes, and configuration. Such issues caused by these conventional vises require expenditure of more time and effort when the woodworker is drilling multiple center holes in different types of workpiece.

To combat this issue, centering devices have been created to grip and secure an object at central points on such centering devices. Conventional centering devices or vises also have two parallel jaws, but each parallel jaw is moveable along the centering device as compared to the conventional vises discussed above. While these centering devices combat the centering issue found in conventional machine and bench vises, these centering devices lack quick and instant adjustment between the two parallel jaws along with to the conventional vises discussed above. Generally, these centering devices utilize screw mechanisms for moving the parallel jaws substantially similar to the screw mechanisms in the conventional vices. With such technology, a woodworker may have to continuously loosen and tighten the screw mechanisms or similar driving mechanism for the specific type of workpiece the woodworker is working on. Such loosening and tightening of the screw mechanism requires expenditure of more time and effort when the woodworker is drilling holes or central holes into various types of workpiece on conventional centering devices.

SUMMARY

The presently disclosed centering device provides a woodworker with a multifunctional tool which may be use for gripping and securing an object at a central location on said centering device in either a first configuration or a second configuration. The disclosed centering device may reduce the overall expenditure of time and effort that a woodworker has to use when drilling or boring central holes in various types of workpiece. The disclosed centering device may also reduce the overall expenditure of time and effort that woodworker has to use for readjusting and reorienting a portable drill or drill press when drilling or boring central holes in various types of workpiece. As such, the centering device disclosed herein addresses some of the inadequacies of previously known drill assisting devices and vises.

In one aspect, an exemplary embodiment of the present disclosure may provide a centering device. The centering device includes a base and a first jaw assembly operably engaged with the base, wherein the first jaw assembly is configured to move longitudinally along the base. The centering device also includes a second jaw assembly operably engaged with the base, wherein the second jaw assembly is opposed to the first jaw assembly, and wherein the second jaw assembly is configured to move longitudinally along the base. The centering device also includes an actuation assembly operably engaged with the base, the first jaw assembly, and the second jaw assembly. The centering device also includes a drive assembly operably engaged with the first jaw assembly. The drive assembly is operable to move the first jaw assembly longitudinally along the base. The movement of the first jaw assembly longitudinally along the base activates the actuation assembly, and the second jaw assembly is caused to move longitudinally along the base via the actuation assembly.

This exemplary embodiment or another exemplary embodiment may further provide that the first jaw assembly and the second jaw assembly are configured to move one of towards one another and away from one another. This exemplary embodiment or another exemplary embodiment may further provide that the drive assembly is operable in one of a first configuration and a second configuration to move the first jaw assembly longitudinally along the base. This exemplary embodiment or another exemplary embodiment may further provide that when the drive assembly is in the first configuration, the drive assembly rotates to move the first jaw assembly longitudinally along the base, and when the drive assembly is in the second configuration, the drive assembly moves linearly to move the first jaw assembly longitudinal along the base. This exemplary embodiment or another exemplary embodiment may further provide that the drive assembly comprises a half-nut operably engaged with the base; and a driving member operably engaged with the first jaw assembly; wherein when the driving member is in a first configuration and is threadably engaged with the half nut, the driving member is rotated to move the first jaw assembly longitudinally along the base; and wherein when the driving member is in a second configuration and is threadably disengaged from the half nut, the driving member is moved linearly to move the first jaw assembly longitudinally along the base. This exemplary embodiment or another exemplary embodiment may further provide a stopper operably engaged with the base and the drive assembly, wherein the stopper is configured to limit the movement of one or both of first jaw assembly and the second jaw assembly. This exemplary embodiment or another exemplary embodiment may further provide that the actuation assembly comprises a primary gear; and a first rack gear operably engaged with the first jaw assembly, wherein the first rack gear and the primary gear mesh with one another and enable the primary gear to move the first jaw assembly linearly and longitudinally along the base. This exemplary embodiment or another exemplary embodiment may further provide a bridge operably engaged with the base between the first jaw assembly and the second jaw assembly. This exemplary embodiment or another exemplary embodiment may further provide that the primary gear is operably engaged with the bridge. This exemplary embodiment or another exemplary embodiment may further provide that the actuation assembly further comprises a second rack gear operably engaged with the second jaw assembly, wherein the second rack gear and the primary gear mesh with one another to enable the primary gear to linearly move the second jaw assembly longitudinally along the base, and wherein the movement of the second rack gear is dependent upon the movement of the first rack gear. This exemplary embodiment or another exemplary embodiment may further provide that the first jaw assembly comprises a first jaw; and a first carrier block operably engaged with the first jaw, wherein the first carrier block is configured to operably engage the first jaw with the actuation assembly and the drive assembly. This exemplary embodiment or another exemplary embodiment may further provide that the base includes a first rail and a second rail; a channel defined between the first rail and the second rail; and a chamber defined between the first rail and the second rail, said chamber being located vertically below the channel and in fluid communication with the channel; and wherein the first carrier block includes a top portion operably engaged with the first jaw, wherein the top portion is positioned inside the channel; and a bottom portion extending from the top portion and operably engaged with the actuation assembly, wherein the bottom portion is positioned inside the chamber defined by the base. This exemplary embodiment or another exemplary embodiment may further provide that the second jaw assembly comprises a second jaw; and a second carrier block, wherein the second carrier block includes an upper portion operably engaged with the second jaw and located within the channel of the base, and a lower portion operably engaged with the actuation assembly and located within the chamber. This exemplary embodiment or another exemplary embodiment may further provide that the first jaw assembly further comprises a cavity defined in the first carrier block; wherein the drive assembly includes an engagement portion, and wherein the engagement portion is received within the cavity. This exemplary embodiment or another exemplary embodiment may further provide that the first jaw assembly includes a first jaw having a first jaw surface; wherein the second jaw assembly includes a second jaw having a second jaw surface; wherein the first jaw surface is opposed to the second jaw surface; and wherein the first jaw surface and the second jaw surface are adapted to simultaneously engage a workpiece located therebetween. This exemplary embodiment or another exemplary embodiment may further provide a first groove defined in the first jaw surface, a second groove defined in the second jaw surface; and wherein the first groove is configured to house a first corner of the workpiece and the second groove is configured to house a second corner of the workpiece.

In another aspect, and exemplary embodiment of the present disclosure may provide a method of centering a workpiece with a centering device. The method comprising steps of introducing the workpiece into the centering device between a first jaw assembly and a second jaw assembly; operating a drive assembly operably engaged with the first jaw assembly; moving the first jaw assembly longitudinally along a base of the centering device and towards the workpiece; activating an actuation assembly operably engaged with the first jaw assembly and the second assembly; moving the second jaw assembly longitudinally along the base, via the actuation assembly, and towards the workpiece in response to movement of the first jaw assembly; centering the workpiece between the first jaw assembly and the second jaw assembly; and securing the workpiece between the first jaw assembly and the second jaw assembly.

This exemplary embodiment or another exemplary embodiment may further provide that the step of moving the second jaw assembly longitudinally along the base further comprises moving a first rack gear of the actuation assembly in a first direction; and moving a second rack gear of the actuation assembly, via a primary gear, in a second direction opposed to the first direction in response to movement of the first rack gear. This exemplary embodiment or another exemplary embodiment may further provide a step of limiting travel of one of the first jaw assembly and the second jaw along the base, via a stopper. This exemplary embodiment or another exemplary embodiment may further provide that the step of operating the drive assembly includes selecting to position the drive assembly in one of a first configuration and a second configuration. This exemplary embodiment or another exemplary embodiment may further provide that the drive assembly is positioned in the first configuration, and the method further comprises rotating a driving member of the drive assembly relative to a half-nut of the drive assembly. This exemplary embodiment or another exemplary embodiment may further provide that the drive assembly is positioned in the second configuration, and the method further comprises linearly moving a driving member of the drive assembly relative to a half-nut of the drive assembly. This exemplary embodiment or another exemplary embodiment may further provide steps of moving the driving member towards the workpiece until the first jaw assembly and the second jaw assembly engage the workpiece; positioning the drive assembly in the first configuration; threadably engaging the driving member with the half-nut; and rotating the driving member of the drive assembly relative to the half-nut of the drive assembly. This exemplary embodiment or another exemplary embodiment may further provide that centering the workpiece between the first jaw assembly and the second jaw assembly further comprises defining a first groove in a first jaw surface of a first jaw of the first jaw assembly; defining a second groove in a second jaw surface of a second jaw of the first jaw assembly; opposing the first jaw surface and the second jaw surface; engaging a first corner of the workpiece in the first groove; and engaging a second corner of the workpiece in the second groove.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-9 illustrates a centering device or self-centering vise for centering a workpiece for drilling purposes; the centering device is generally referred to as 1 in FIGS. 1-9. As described in more detail below, the centering device 1 allows a woodworker to quickly grasp and grip a workpiece (such as workpiece "WP" shown in FIG. 8A-9) in the center of the centering device 1.

Figure 1:
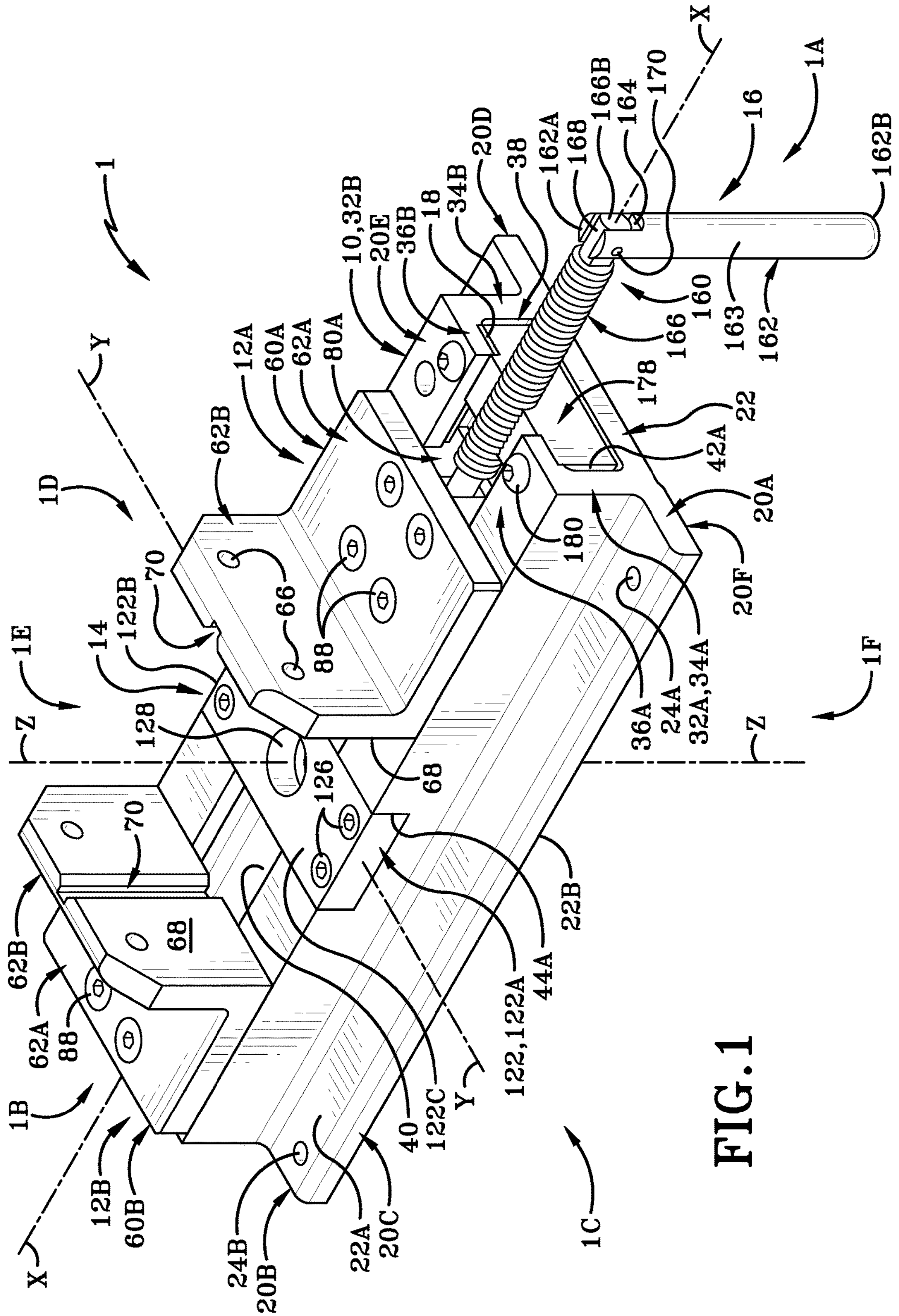
FIG. 1 is a top, front, left side isometric perspective view of a centering device in accordance with an aspect of the present disclosure.
Figure 2:
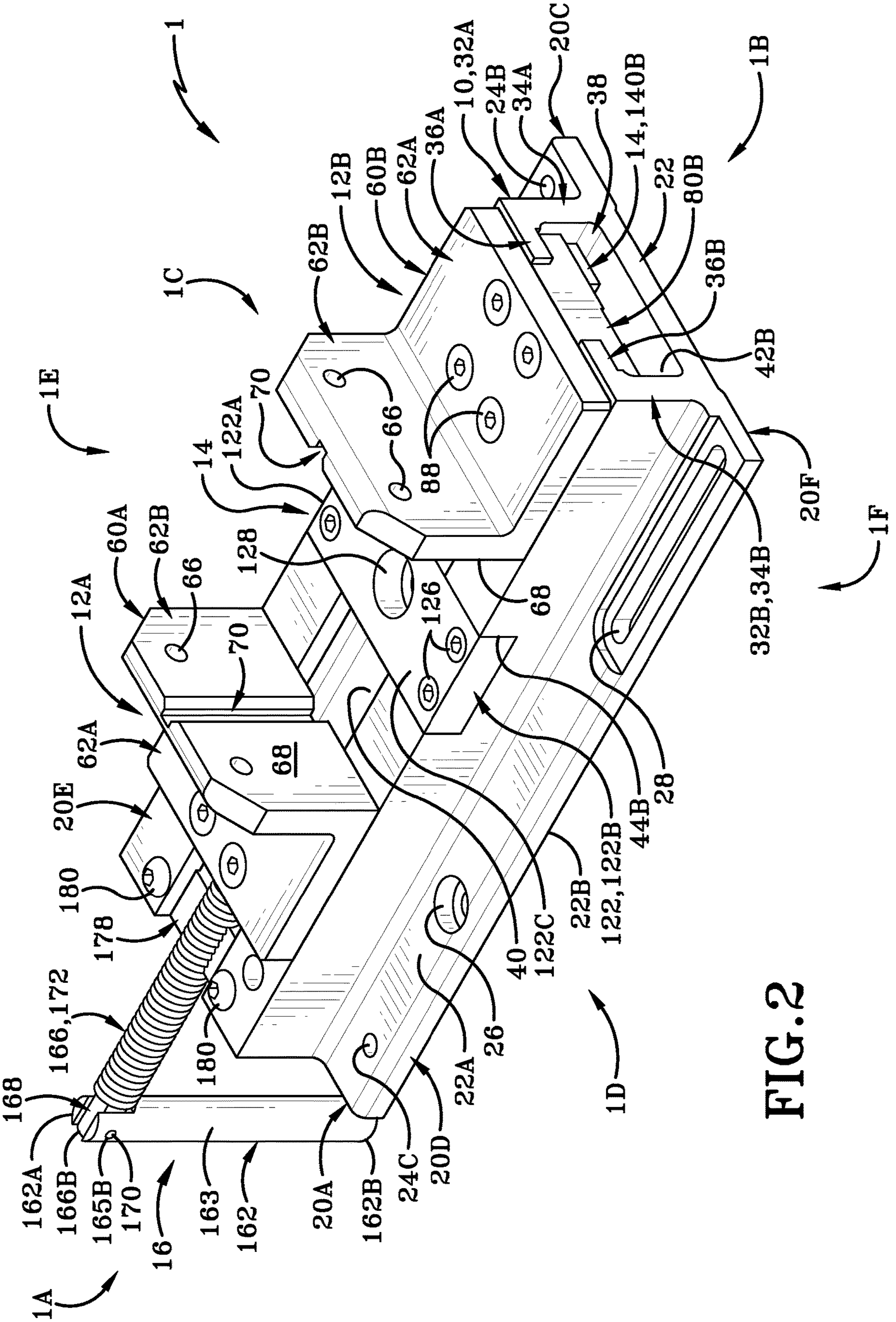
FIG. 2 is a top, rear, right side isometric perspective view of the centering device.

As illustrated in FIGS. 1 and 2, the centering device 1 includes a front or first end 1A, an opposing rear or second end 1B, and a longitudinal direction defined therebetween. The centering device 1 also includes a left side or first side 1C, an opposing right side or second side 1D, and a transverse direction defined therebetween. The centering device 1 also includes a top or third end 1E, an opposing bottom or fourth end 1F, and a vertical direction defined therebetween. Additionally, the centering device 1 has a longitudinal axis "X" defined between the front end 1A and the rear end 1B, a transverse axis "Y" defined between the left side 1C and the right side 1D, and a vertical axis "Z" defined between the top end 1E and the bottom end 1F. It should be understood that the terms "front," "rear," "left," "right," "top," "bottom", and other directional derivatives used to describe the orientation of centering device 1 illustrated in the attached figures should in no way be considered to limit the orientation in which centering device 1 may be utilized during a drilling operation.

Still referring to FIGS. 1 and 2, the centering device 1 includes a base 10. The centering device 1 also includes a first jaw assembly 12A that operably engages with the base 10 where the first jaw assembly 12A is configured to move longitudinally along the base 10. The centering device 1 also includes a second jaw assembly 12B that operably engages with the base 10 where the second jaw assembly 12B is opposed to the first jaw assembly 12A and where the second jaw assembly 21B is configured to move longitudinally along the base 10. The centering device 1 also includes an actuation assembly 14 that operably engages with the base 10, the first jaw assembly 12A, and the second jaw assembly 12B. The centering device 1 also includes a drive assembly 16 that operably engages with the first jaw assembly 12A. The drive assembly 16 is also operable to move the first jaw assembly 12A longitudinally along the base 10 where the movement of the first jaw assembly 12A longitudinally along the base 10 activates the actuation assembly 14 causing the second jaw assembly 12B to move longitudinally along the base 10 via said actuation assembly 14. In other words, the second jaw assembly 12B moves longitudinally along the base 10 subsequent to the first jaw assembly 12A moving longitudinally along the base 10.

Referring to FIGS. 1 and 2, the base 10 includes a front or first end 20A, a rear or second end 20B, and a longitudinal axis defined therebetween that is parallel to the longitudinal axis "X" shown in FIG. 1. The base 10 also includes a left side or first side 20C, a right side or second side 20D, and a transverse axis defined therebetween that is parallel to the transverse axis "Y" shown in FIG. 1. The base 10 also includes a top end or third end 20E, a bottom end or fourth end 20F, and a vertical axis defined therebetween that is parallel to the vertical axis "Z" shown in FIG. 1.

Figure 2A:
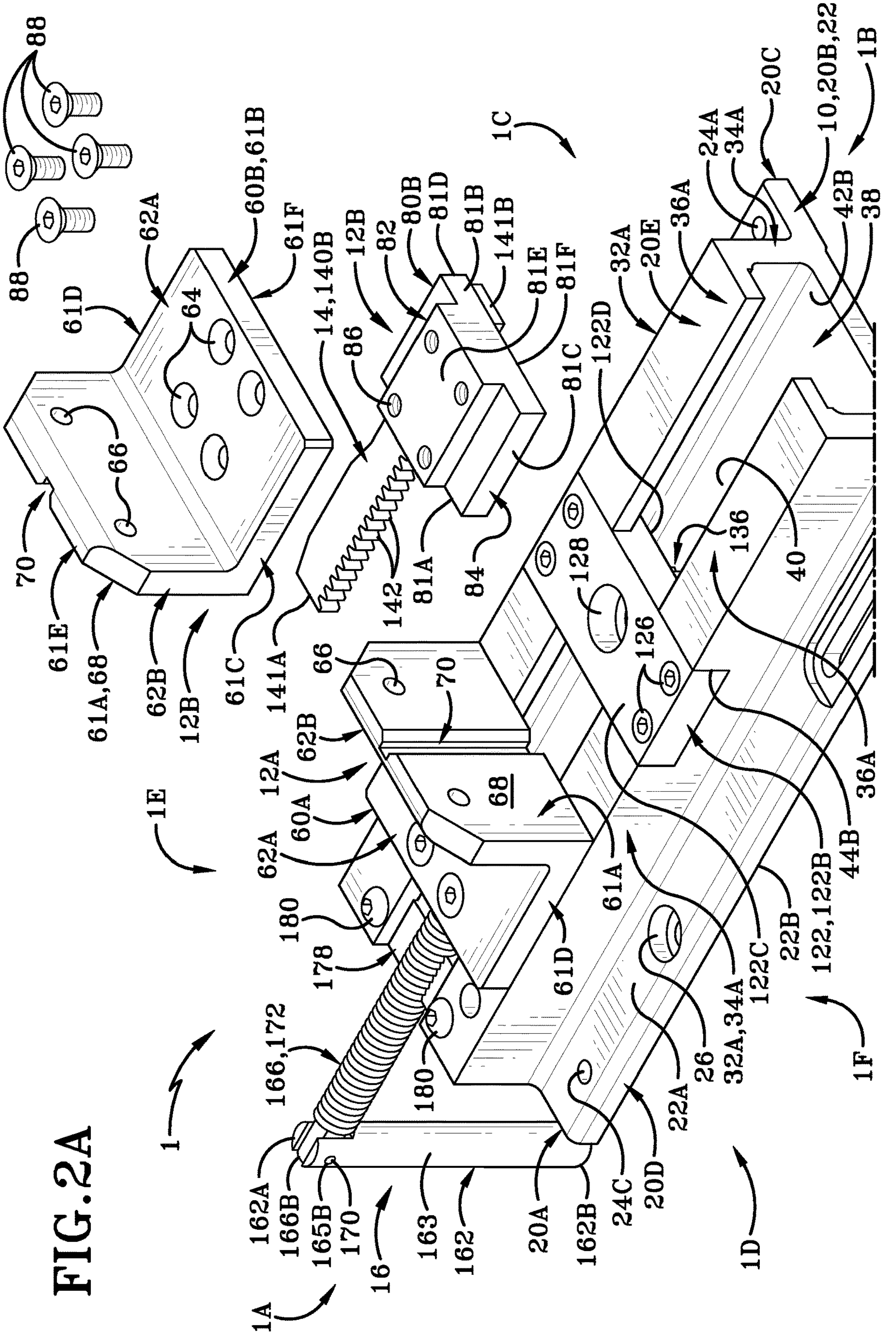
FIG. 2A is a top, rear, right side isometric perspective view of the centering device with a second jaw assembly and another portion of the actuation assembly exploded away from the base of the centering device.

Referring to FIGS. 1-2A, the base 10 includes a base plate 22. The base plate 22 includes a top surface 22A proximate to the top end 20E of the base 10. The base plate 22 also includes an opposing bottom surface 22B proximate to the bottom end 20F of the base 10. Referring to FIG. 1, a first aperture 24A may be defined in the base plate 22 proximate to the front end 20A and the left side 20C of the base 10. The first aperture 24A extends entirely through the base plate 22 from the top surface 22A to the bottom surface 22B where the top surface 22A and the bottom surface 22B are in fluid communication with one another via the first aperture 24A. Still referring to FIG. 1, a second aperture 24B may be defined in the base plate 22 proximate to the rear end 20B and the left side 20C of the base 10. The second aperture 24B also extends entirely through the base plate 22 from the top surface 22A to the bottom surface 22B where the top surface 22A and the bottom surface 22B are in fluid communication with one another via the second aperture 24B. As provided herein, the first and second apertures 24A, 24B of the base plate 22 provides a structural configuration for the base 10 that allow connectors or fasteners to operably engage the base 10 to a work surface to prevent movement of the base 10 when using the centering device 1.

Referring to FIGS. 2-2A, the base 10 may have a third aperture 24C defined in the base plate 22 proximate to the rear end 20B and right side 20D of the base 10. The third aperture 24C extends entirely through the base plate 22 from the top surface 22A to the bottom surface 22B where the top surface 22A and the bottom surface 22B are in fluid communication with one another via the third aperture 24C. Similar to the first and second apertures 24A, 24B, the third aperture 24C of the base plate 22 provides a structural configuration for the base 10 that allows a connector or a fastener to operably engage the base 10 to a work surface to prevent movement of the base 10 when using the centering device 1.

Still referring to FIGS. 2-2A, the base 10 may also have a recessed aperture 26 defined in the base plate 22 proximate to the rear end 20B and right side 20D of the base 10. The recessed aperture 26 extends entirely through the base plate 22 from the top surface 22A to the bottom surface 22B where the top surface 22A and the bottom surface 22B are in fluid communication with one another via the recessed aperture 26. The recessed aperture 26 may enable a woodworker to operably engage the base 10 to another woodworking device (such as an angle drilling table, drill press table, etc.) by inserting fasteners or other similar connecting member of the like through the recessed aperture 26. The base 10 may also have a recessed slot 28 defined in the base plate 22 proximate to the front end 20A and right side 20D of the base 10. The recessed slot 28 extends entirely through the base plate 22 from the top surface 22A to the bottom surface 22B where the top surface 22A and the bottom surface 22B are in fluid communication with one another via the recessed slot 28. The recessed slot 28 may enable a woodworker to operably engage the base 10 to another woodworking device (such as an angle drilling table, drill press table, etc.) by inserting fasteners or other similar connecting member of the like through the recessed slot 28.

Figure 6:
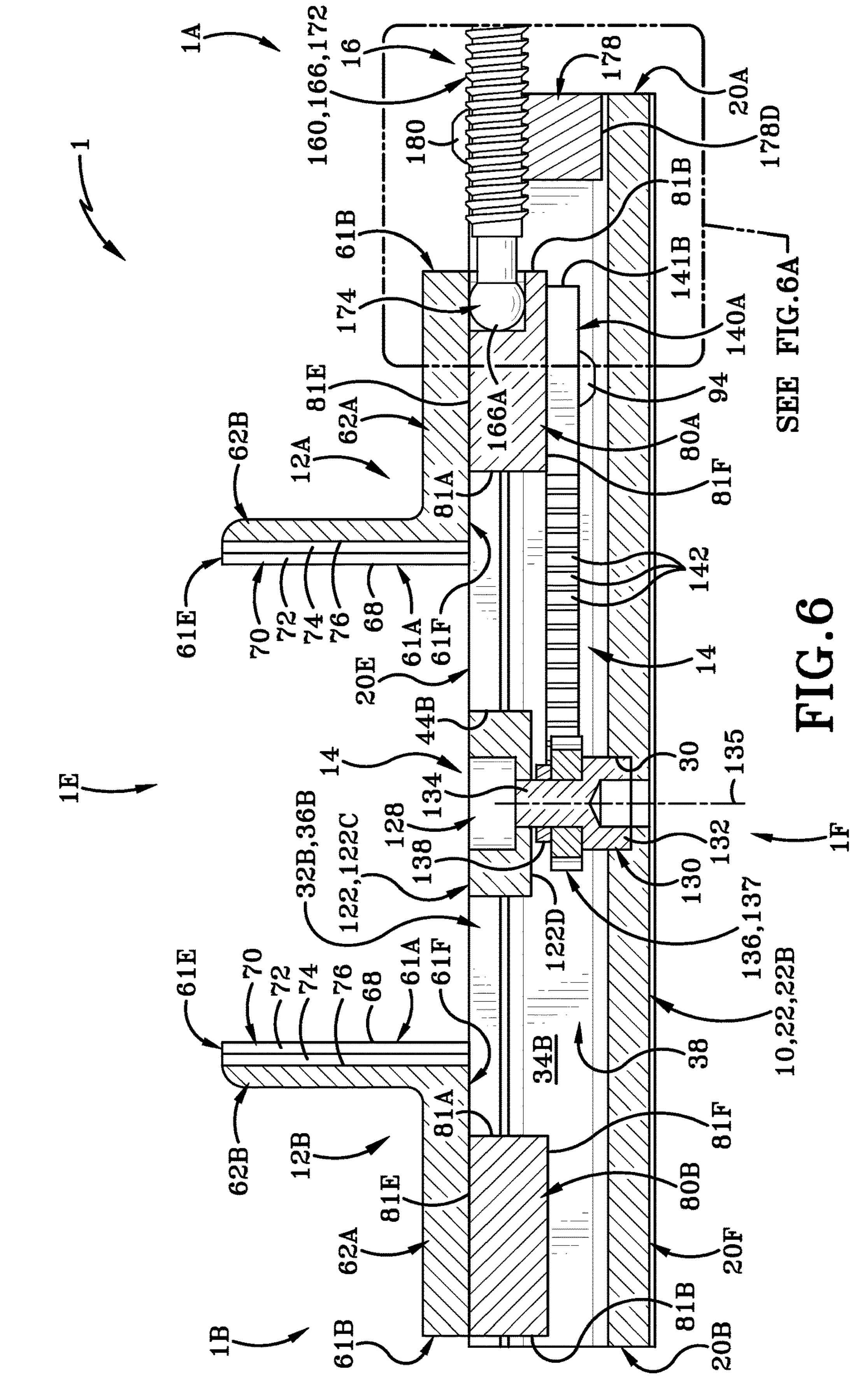
FIG. 6 is a longitudinal section view of the centering device taken in the direction of line 6-6 in FIG. 5; wherein first and second jaw assemblies are provided in a disengaged position.

Referring to FIG. 6, the base 10 may also have a central recessed aperture 30 defined in the base plate 22 between the front and rear end 20A, 20B and the left and right sides 20C, 20D. The central recessed aperture 30 extends entirely through the base plate 22 from the top surface 22A to the bottom surface 22B where the top surface 22A and the bottom surface 22B are in fluid communication with one another via the central recessed aperture 30. Such use and purpose of the central recessed apertures 30 of the base 10 is described in more detail below.

Referring to FIGS. 1-5, the base 10 may include a first rail 32A that extends upwardly from the top surface 22A of the base plate 22. The first rail 32A may have a first upright support 34A that is proximate to the left side 20C of the base 10B. The first upright support 34A also extends upwardly from the top surface 32 along an axis parallel with the vertical axis "Z" of the centering device 1. The base 10 may also include a second rail 32B opposite to the first rail 32B that extends upwardly from the top surface 22A of the base plate 22. The second rail 32B may also include an opposing second upright support 34B that is proximate to the right side 20D of the base 10B. The second upright support 34B also extends upwardly from the top surface 22A along an axis parallel with the vertical axis "Z" of the centering device 1. Each upright support 34A, 34B may also have an extension 36A, 36B extending transversely away from the respective upright support 34A, 34B. Specifically, the first extension 36A extends transversely away from the first upright support 34A towards the second upright 34B along an axis parallel with the transverse axis "Y" of the centering device 1. The second extension 36B also extends transversely away from the second upright support 34B towards the first upright 34A along an axis parallel with the transverse axis "Y" of the centering device 1. Such use of the first and second rails 32A, 32B is described in more detail below.

Still referring to FIGS. 1-5, a passageway 38 is collectively defined by the first upright support 34A, the second upright support 34B, the first extension 36A, and the second extension 36B of the first and second rails 32A, 32B. A top channel 40 is collectively defined by the first extension 36A and the second extension 36B to provide access to the passageway 38 proximate the top end 20E of the base 10. Additionally, first and second openings 42A, 42B are collectively defined by the first upright support 34A, the second upright support 34B, the first extension 36A, and the second extension 36B to provide access to the passageway 38. The first opening 42A is defined proximate to the front end 20A, and the second opening 42B is defined proximate to the rear end 20B.

Figure 7:
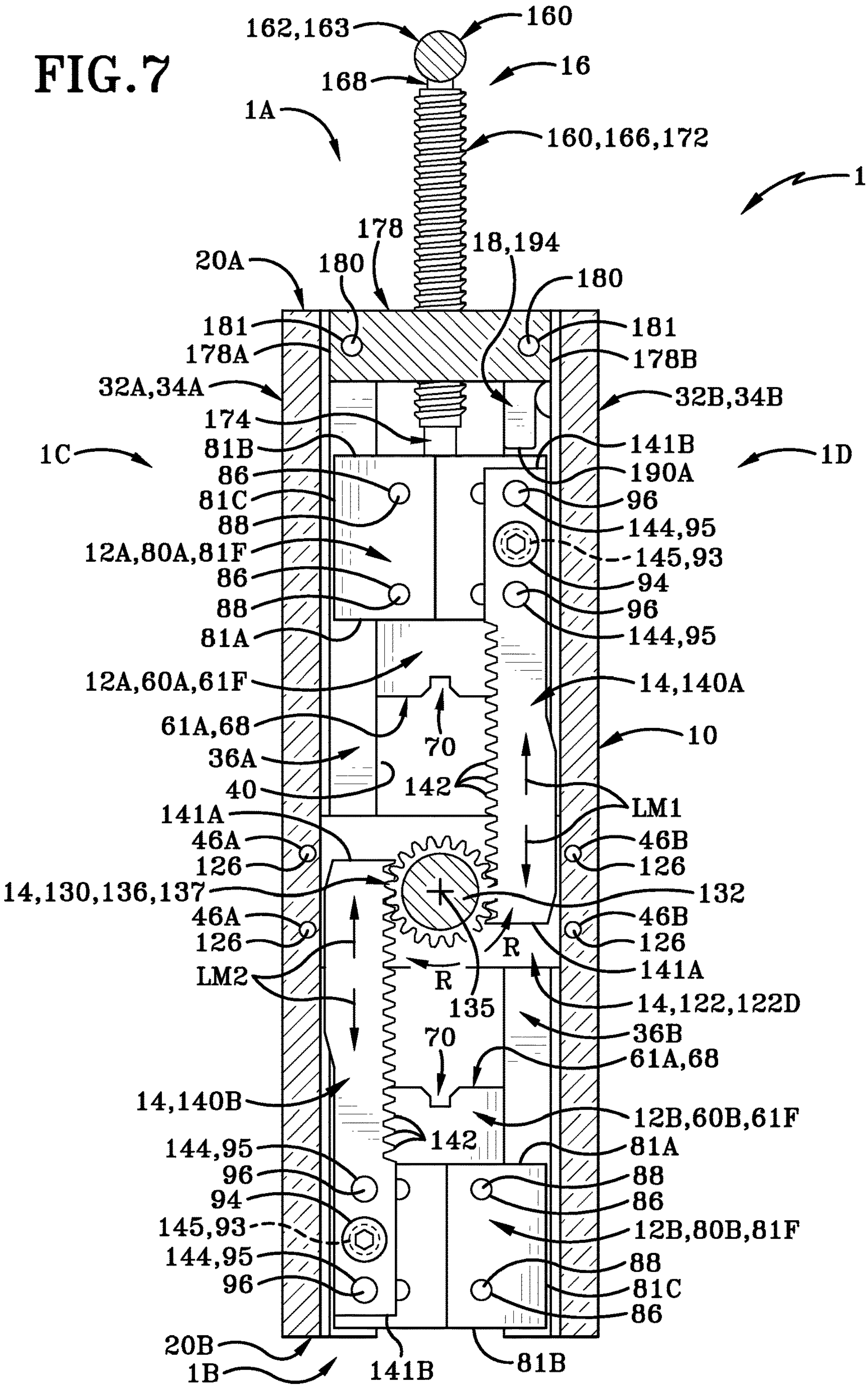
FIG. 7 is a longitudinal section view of the centering device taken in the direction of line 7-7 in FIG. 3; wherein a first rack gear of an actuation assembly moves in a first direction, via the driving member, causing a second rack gear of the actuation assembly to move in an opposing second direction via a primary gear of the actuation assembly.

Referring to FIGS. 1-2A and 6, a first indentation 44A is defined in the first rail 32A and a second indentation 44B is defined in the second rail 32B. The first indentation 44A is defined in a portion of the first upright support 34A and in a portion of the first extension 36A. The first indentation 44A is also defined between the front and rear ends 20A, 20B of the base 10. The second indentation 44B is defined in a portion of the second upright support 34B and in a portion of the second extension 36B. The second indentation 44B is also defined between the front and rear ends 20A, 20B of the base 10. The first and second indentation 44A, 44B are also aligned with one another along an axis parallel with the transverse axis "Y" of the centering device 1. As illustrated in FIG. 7, first and second sets of threaded apertures 46A, 46B may be defined in each upright support 34A, 34B inside of each respective indentation 44A, 44B. The first set of threaded apertures 46A is defined in the first upright 34A inside of the first indentation 44A, and the second set of threaded apertures 46B is defined in the second upright 34B inside of the second indentation. Such uses of the indentations 44A, 44B and the sets of threaded apertures 46A, 46B are described in more detail below.

Referring FIGS. 1-2A, the first jaw assembly 12A and the second jaw assembly 12B are operably engaged with the base 10, particularly with the rails 32A, 32B of the base 10. In the illustrated embodiment, the first jaw assembly 12A and the second jaw assembly 12B are substantially similar to one another and are operably engaged with the first and second rails 32A, 32B in a mirrored orientation. Inasmuch as the first jaw assembly 12A and the second jaw assembly 12B are substantially similar, the following description will relate to the first jaw assembly 12A. It should be understood, however, that the description of the first jaw assembly 12A applies substantially equally to the second jaw assembly 12B.

The first jaw assembly 12A includes a jaw 60A for grasping and securing a workpiece to the centering device 1, which is described in more detail below. The jaw 60A includes an inner or first end 61A, an outer or second end 61B opposite to the first end 61A, and a longitudinal direction defined therebetween. The jaw 60A also includes a first side 61C, a second side 61D opposite to the first side 61C, and a transverse axis defined therebetween. The jaw 60A also includes a top or third end 61E, a bottom or fourth end 61F, and a vertical axis defined therebetween. Similarly, the second jaw assembly 12B includes a jaw 60B substantially similar to the jaw 60A of the first jaw assembly 12A.

As shown in FIGS. 1-2A, the jaw 60A has a first portion 62A and a second portion 62B positioned orthogonally to the first portion 62A. The first portion 62A operably engages with the first and second rails 32A, 32B of the base 10, particularly with the first and second extensions 36A, 36B of the rail 32. The second portion 62A also operably engages with the first and second rails 32A, 32B of the base 10 exterior to the passageway 38 and the channel 40 and vertically above the passageway 38 and the channel 40. As such, the first jaw 60A is adapted to be slidably moveable along an exterior surfaces of first and second rails 32A, 32B (particularly the first and second extensions 36A, 36B) during a centering operation. The first portion 62A of the jaw 60A also defines a first set of holes 64 proximate to the bottom end 61F of the jaw 60A. Each hole of the first set of holes 64 extends entirely through the first portion 62A. Such use and purpose of the first set of holes 64 is described in more detail below.

The second portion 62B operably engages with a workpiece (such as workpiece "WP") during operation of the centering device 1. The second portion 62B of the jaw 60A also defines a second set of holes 66 proximate to the top end 61E of the jaw 60A. Each hole of the second set of holes 66 extends entirely through the second portion 62B. Each hole of the second set of holes 66 may allow a woodworker to introduce a connector or fastener into a respective hole of the second set of holes 66 to operably engage a workpiece with the first jaw 60A during a clamping operation.

As shown in FIGS. 1-2A, the jaw 60A also includes a jaw surface 68 provided on the second portion 62B of the jaw 60A proximate to the first end 61A of the jaw 60A. The jaw surface 68 is adapted to operably engage with a workpiece to grasp and secure said workpiece with the centering device 1. As illustrated herein, the jaw surface 68 is substantially planar or flat along the second portion 62B of the jaw 60A. In other exemplary embodiments, a jaw surface of a jaw may have any suitable structural configuration for grasping and gripping a workpiece to a centering device. In one exemplary embodiment, a jaw surface defined along a second portion of a jaw may be rounded or curvilinear to grasp and secure complementary rounded or curvilinear objects. In another exemplary embodiment a jaw surface defined along a second portion of a jaw may be multifaceted to grasp and secure objects with asymmetric geometries. In other exemplary embodiments, a jaw surface defined along a second portion of a jaw may have suitable configuration to grasp and secure objects with specific geometries.

Figure 5:
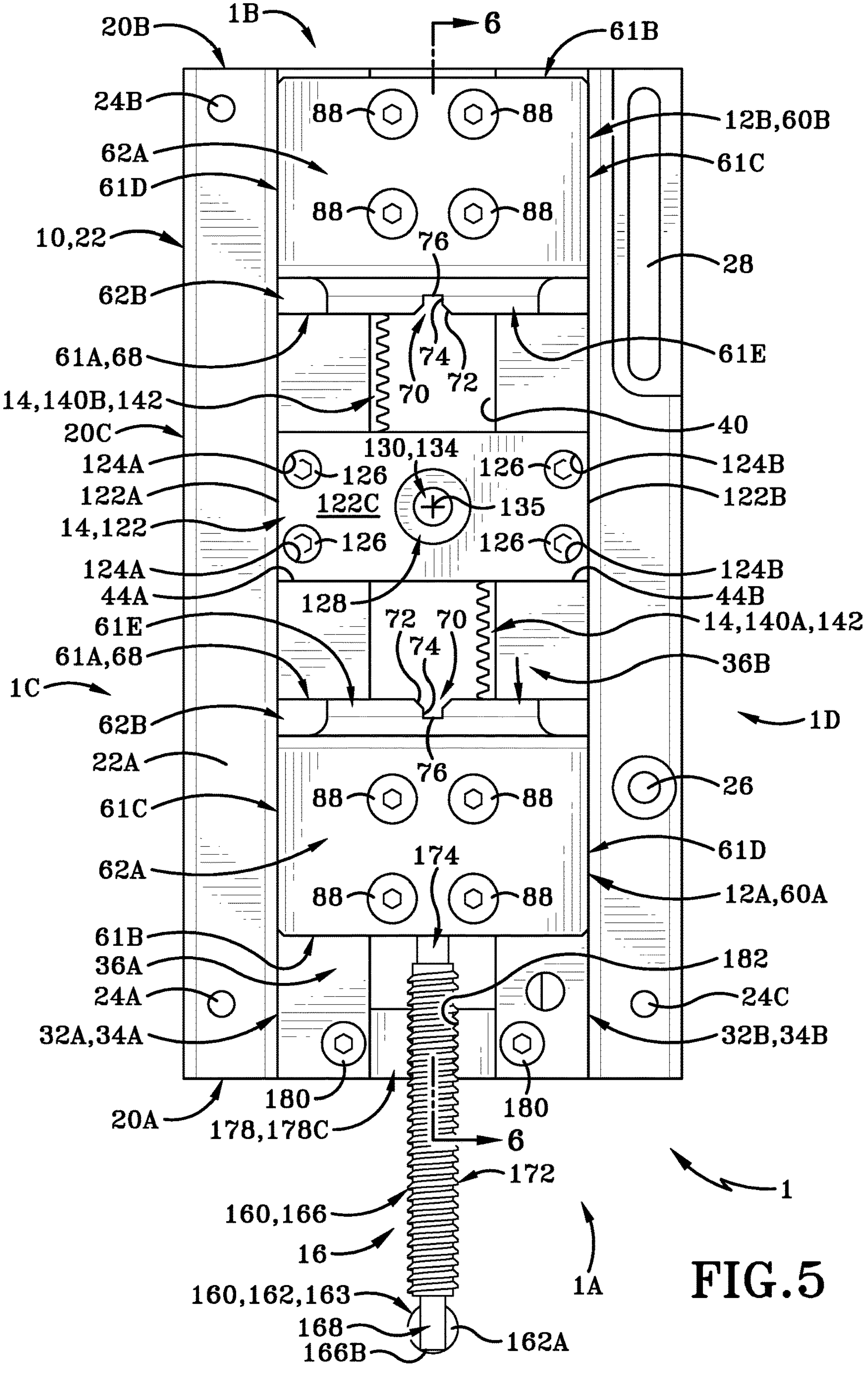
FIG. 5 is a top plan view of the centering device.
Figure 9:
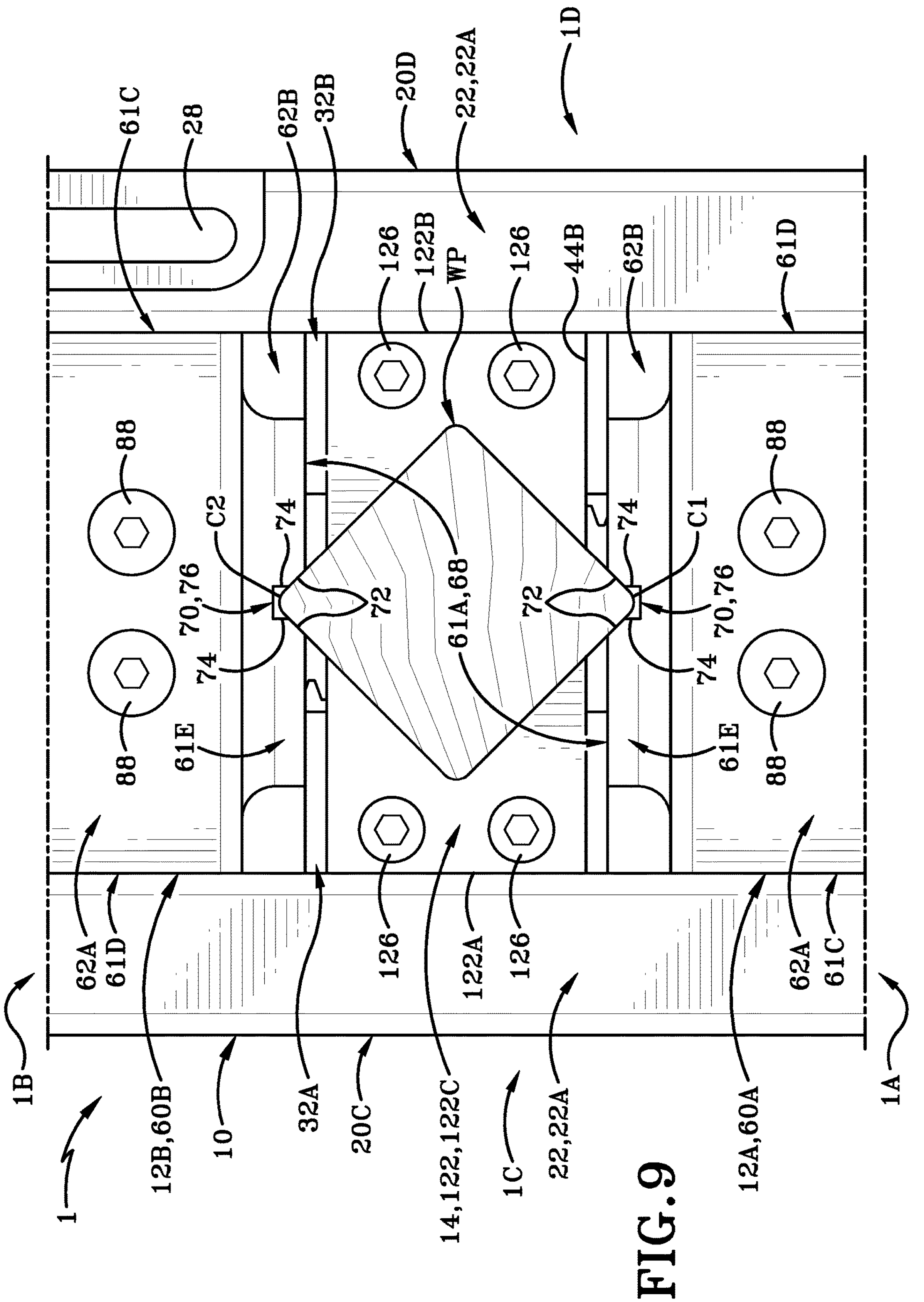
FIG. 9 is a partial top plan view of the centering device, wherein the first and second jaw assemblies are gripping the workpiece, and wherein first and second corners of the workpiece are disposed inside of first and second grooves defined by the first and second jaw assemblies.

As illustrated in FIGS. 1-2A and 5, the first jaw 60A also defines a groove 70 that extends into the second portion 62B of the jaw 60A. As illustrated in FIGS. 5 and 9, the groove 70 defined in the first jaw 60A has angled or chamfered edges 72 that extend from the jaw surface 68 towards the second end 61B of the first jaw 60A. The chamfered edges 72 are configured to allow the first jaw 60A and second jaw 60B to hold a rounded or curvilinear workpiece (e.g., a dowel) on the jaw surfaces 68 to prevent against rotation along jaw surfaces 68 while the workpiece is grasped and secured by the first jaw 60A and the second jaw 60B. In the illustrated embodiment, each chamfered edge 72 of the first and second jaws 60A, 60B is defined at an angle of about 45 degrees relative to the jaw surface 68 of the respective jaw 60A, 60B. In other exemplary embodiments, each chamfered edge on first and second jaws may be defined at any suitable angle based on various considerations, including the size, shape, and configuration of the workpiece being grasped and secured by a first jaw and a second jaw of a centering device.

Still referring to FIGS. 1-2A and 5, the groove 70 defined by the first jaw 60A also has straight or planar edges 74 that extend from the chamfered edges 72 to a base wall 76 terminating the groove 70. The planar edges 74 are configured to allow the first jaw 60A and second jaw 60B to hold opposing corners or edges of a workpiece in the jaws 60A, 60B to prevent against rotation along jaw surfaces 68 while the workpiece is grasped and gripped by the first jaw 60A and the second jaw 60B. In the illustrated embodiment, each planar edge 74 of the first and second jaws 60A, 60B is substantially perpendicular or orthogonal to the jaw surface 68 of the respective jaw 60A, 60B. In other exemplary embodiments, each planar edge on first and second jaws may be defined at any suitable angle based on various considerations, including the size, shape, and configuration of the workpiece being grasped and gripped by a first jaw and a second jaw of a centering device.

As illustrated in FIGS. 1A, 3, and 6-7, the first jaw assembly 12A also includes a first carrier block 80A that is operably engaged with the first jaw 60A. The first carrier block 80A includes a first end 81A, a second end 81B opposite to the first end 81A, and a longitudinal direction defined therebetween. The first carrier block 80A also includes a left or first side 81C, a right or second side 81D, and a transverse axis defined therebetween. The first carrier block 80A also includes a top or third end 81E, a bottom or fourth end 81F, and a vertical axis defined therebetween. Similarly, the second jaw assembly 12B includes a second carrier block 80B that is operably engaged with the second jaw 60B, which is substantially similar to the first carrier block 80A.

Figure 1A:
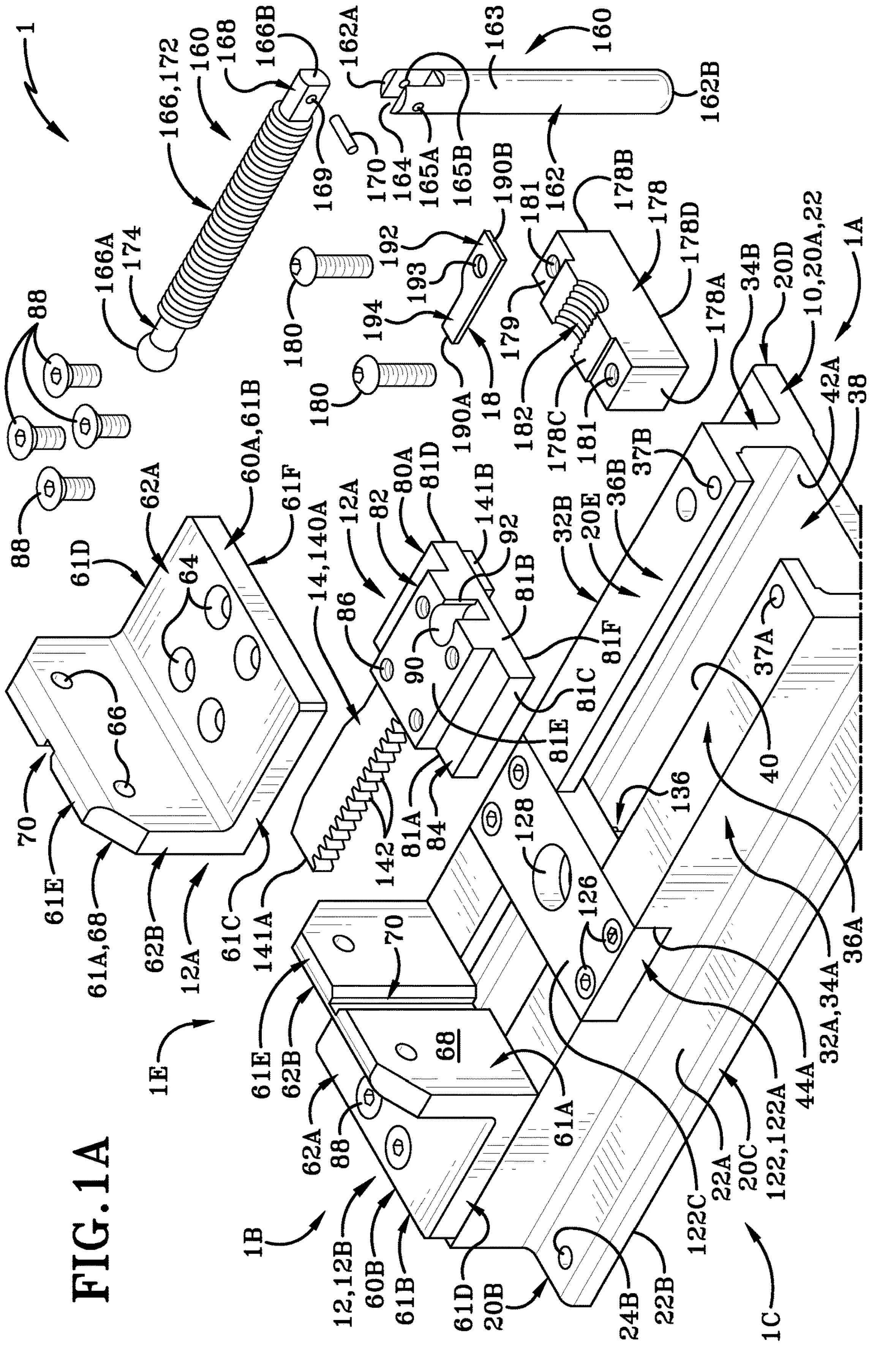
FIG. 1A is a top, front, left side isometric perspective view of the centering device with a first jaw assembly, a portion of an actuation assembly, and a drive assembly exploded away from a base of the centering device.

As shown in FIGS. 1A and 6, the first carrier block 80A has an upper portion 82 and a lower portion 84 operably engaged with the upper portion 82 vertically below said upper portion 82. The upper portion 82 is positioned within the first and second rails 32A, 32B of the base 10, particularly between the first and second extensions 36A, 36B of the first and second rails 32A, 32B inside of the channel 40 and vertically above the passageway 38. As such, the first carrier block 80A is adapted to be moveable between the first and second extensions 36A, 36B inside of the channel 40 without contacting the first and second rails 32A, 32B during a centering operation. The lower portion 84 is also positioned within the first and second rails 32A, 32B of the base 10, particularly between first and second upright supports 34A, 34B of the first and second rails 32A, 32B inside of the passageway 38 and vertically below the channel 40. As such, the first carrier block 80A is adapted to be moveable between the first and second upright supports 34A, 34B inside of the channel 40 without contacting the first and second rails 32A, 32B during a centering operation.

The first carrier block 80A also defines a first set of attachment holes 86 where each hole of the first set of attachment holes 84 extends entirely through the first carrier block 80A. In other words, each hole of the first set of attachment holes 84 extends entirely through the upper portion 82 and the lower portion 84 of the first carrier block 80. The first set of attachment holes 84 of the first carrier block 80A allows the first jaw 60A to operably engage with the first carrier block 80A via a set of fasteners 88. While the set of fasteners 88 is used to operably engage the first carrier block 80A to the first jaw 60A, any suitable engagement may be used to operably engage a first carrier block with a first jaw. Examples of suitable engagement to operably engage a first carrier block with a first jaw may include adhering, affixing attaching, connecting, coupling, fastening, fixing, joining, linking, locking, mounting, securing, and any other suitable engagement for operably engaging a first carrier block with a first jaw.

Figure 6A:
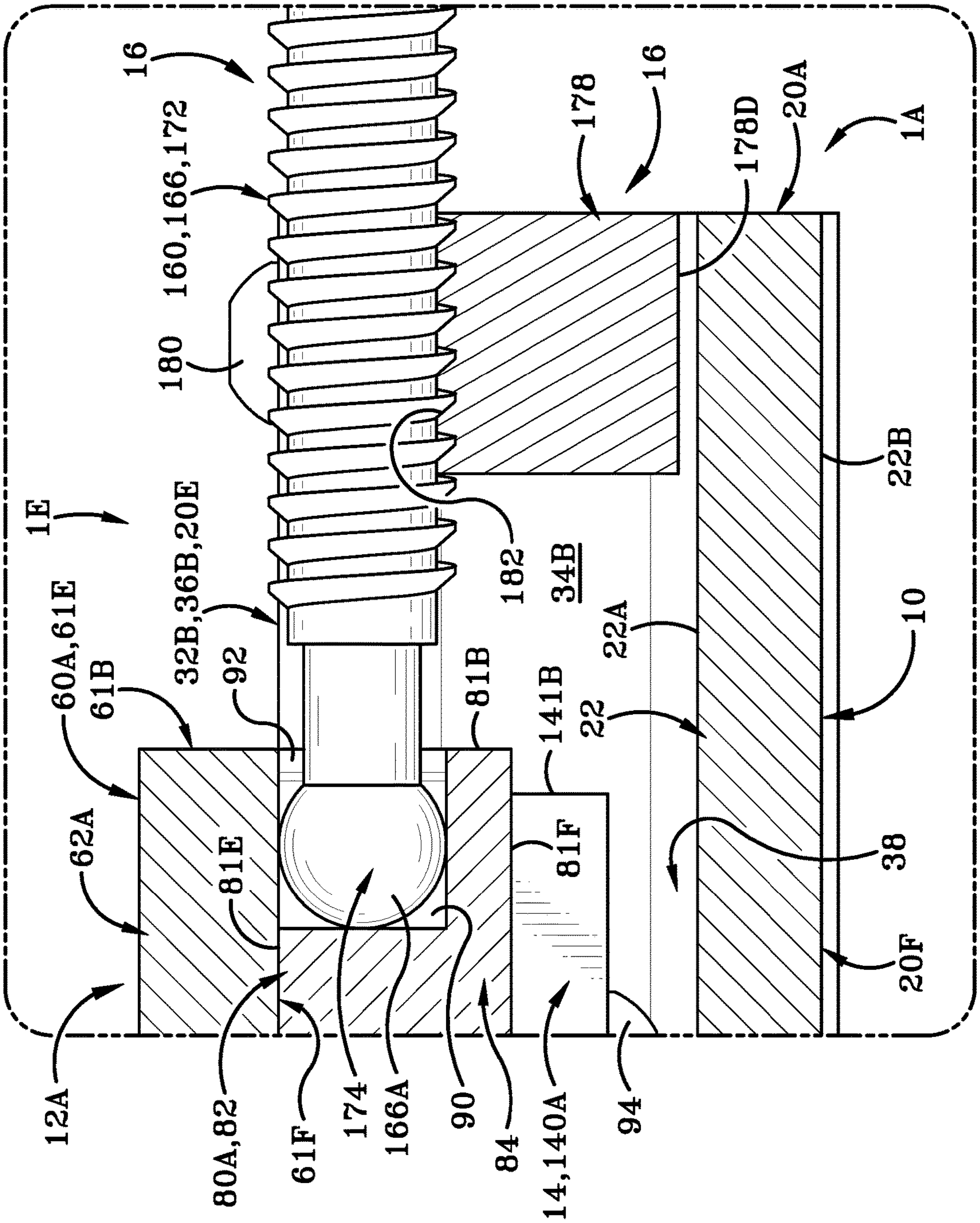
FIG. 6A is an enlargement view of the highlighted area shown in FIG. 6, wherein a driving member of the drive assembly is threadably engaged with a half-nut of the drive assembly in a first configuration.
Figure 6B:
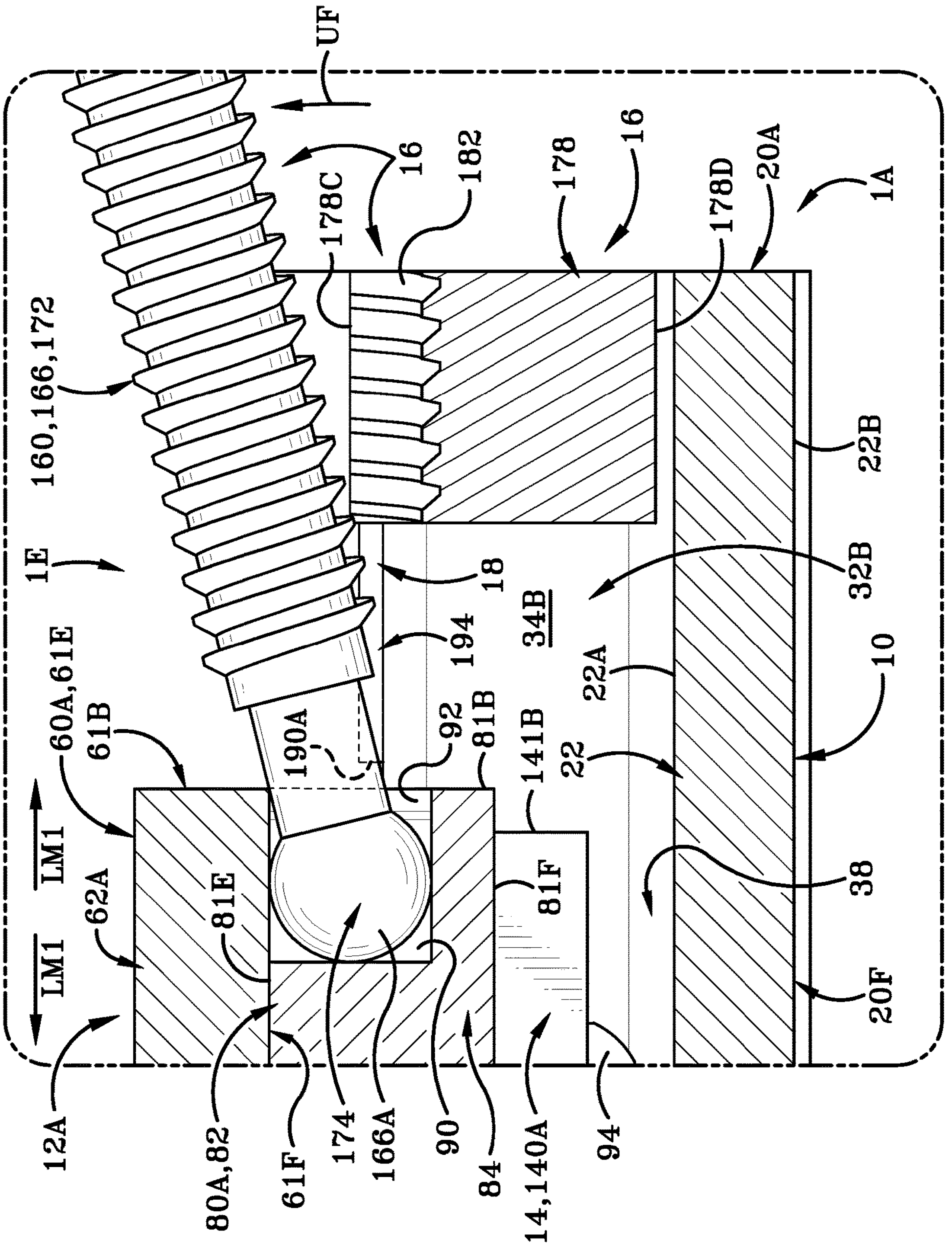
FIG. 6B is a partial longitudinal cross-section view similar to FIG. 6A, but the driving member is threadably disengaged with the half-nut in a second configuration.

Referring to FIGS. 1A and 6-6B, the first carrier block 80A also defines a cavity 90 proximate to the second end 81B of the first carrier block 80A. In the illustrated embodiment, the cavity 90 extends downwardly from the upper portion 82 and terminates in the lower portion 84. The cavity 90 is accessible at the top end 81E of the first carrier block 80A. The cavity 90 is also accessible through an opening 92 defined by the first carrier block 80A at the second end 81B of said first carrier block 80A. As described in more detail below, the cavity 90 and the opening 92 allows for assemblies and components of the drive assembly 16 to operably engage with the first carrier block 80A. As for the second jaw assembly 12B, the second carrier block 80B is free of any cavity or opening similar to the cavity 90 and the opening 92 defined in the first carrier opening 80A. In one exemplary embodiment, a second carrier block of a second jaw assembly may define a cavity and an opening to allow for assemblies and components of a drive assembly to operably engage with the second carrier block.

The first carrier block 80A also defines a lower threaded opening 93 that extends entirely through the lower portion 84 proximate to the right side 81D of the first carrier block 80A. The lower threaded opening 93 of the first carrier block 80A allows the first jaw assembly 12A to operably engage with the actuation assembly 14 via a connector 94. Additionally, the first carrier block 80A also defines a second set of attachment holes 95 that extends entirely through the lower portion 84 proximate to the right side 81D of the first carrier block 80A. The second set of attachment holes 95 of the first carrier block 80A allows the first jaw assembly 12A to operably engage with the actuation assembly 14 via a set of pins 96. While the connector 94 and the set of pins are used to operably engage the first jaw assembly 12A with the actuation assembly 14, any suitable engagement may be used to operably engage a first jaw assembly with an actuation assembly. Examples of suitable engagement to operably engage a first jaw assembly with an actuation assembly may include adhering, affixing attaching, connecting, coupling, fastening, fixing, joining, linking, locking, mounting, securing, and any other suitable engagement for operably engaging a first jaw assembly with an actuation assembly.

As illustrated in FIGS. 6 and 7, the actuation assembly 14 operably engages with the base 10 and the first and second jaw assemblies 12A, 12B. In the illustrated embodiment, the actuation assembly 14 allows the first and second jaw assemblies 12A, 12B to linearly move along the longitudinal axis of the base 10 via a pushing or pulling force exerted on the drive assembly 16 by a woodworker, which is described in more detail below. In operation, the actuation assembly 14 enables the second jaw assembly 12B to move longitudinally along the base 10 subsequent to the movement of the first jaw assembly 12A created on the drive assembly 16 by a woodworker.

As illustrated in FIGS. 6 and 7, the actuation assembly 14 includes a bridge 122 that operably engages with the first and second rails 32A, 32B of the base 10. As illustrated in FIGS. 5 and 6, the bridge 122 includes a first end 122A, an opposing second end 122B, and a longitudinal axis defined therebetween. The bridge 122 also includes a top end 122C, an opposing bottom end 122D, and a vertical axis defined therebetween. As illustrated in FIGS. 1 and 2, the first end 122A of the bridge 122 operably engages with the first rail 32A inside of the first indentation 44A defined in the first upright support 34A and the first extension 36A. The second end 122A of the bridge 122 also operably engages with the second rail 32B inside of the second indentation 44B defined in the second upright support 34B and the second extension 36B.

As illustrated in FIG. 5, the bridge 122 defines a first set of recessed openings 124A proximate to the first end 122A of the bridge 122. Each opening of the first set of recessed openings 124A extends entirely through the bridge 122 from the top end 122C to the bottom end 122D. Once the bridge 122 operably engages with the first rail 32A, the first set of recessed openings 124A is coaxial with the first set of threaded apertures 46A defined in the first rail 32A inside of the first indentation 44A. The bridge 122 also defines a second set of recessed openings 124B proximate to the second end 122B of the bridge 122. Each opening of the second set of recessed openings 124B extends entirely through the bridge 122 from the top end 122C to the bottom end 122D. Once the bridge 122 operably engages with the second rail 32B, the second set of recessed openings 124B is coaxial with the second set of attachment apertures 46B defined in the second rail 32B inside of the second indentation 44B. A set of securement members 126 operably engages the bridge 122 with the rails 32A, 32B via the first and second sets of attachment apertures 46A, 46B defined in the rails 32A, 32B and the first and second sets of recessed openings 124A, 124B of the bridge 122.

Referring to FIG. 6, the bridge 122 defines a central recessed opening 128. The central recessed opening 128 extends entirely through the bridge 122 from the top end 122C to the bottom end 122D where the top and bottom ends 122C, 122D are in fluid communication with one another. The central recessed opening 128 is sized and configured to allow a drill bit to enter into the bridge 122 when the woodworker drills entirely through a workpiece for boring a central hole.

Referring to FIGS. 5 and 6, the actuation assembly 14 includes a primary gear shaft 130 that operably engages with the bridge 122 and the base 10. Specifically, a head 132 of the primary gear shaft 130 operably engages with the base 10 inside of the central recessed aperture 26. A support rod 134 of the primary gear shaft 130 also operably engages with the bridge 122 inside of the central recessed opening 128 where the support rod 134 extends upwardly from the head 132. A primary gear or pinion gear 136 with radial teeth 137 operably engages with the support rod 134 of the primary gear shaft 130; the primary gear 136 is configured to rotate about a longitudinal axis 135 of the support rod 134. A washer 138 operably engages with the support rod 134 and contacts the primary gear 136 to provide a buffer between the primary gear 136 and the bridge 122 during operation.

As illustrated in FIG. 7, the actuation assembly 14 also includes at least one rack gear 140 operably engaged with one or both of the first and second jaw assemblies 12A, 12B. In the illustrated embodiment, a first rack gear 140A operably engages with the first jaw assembly 12A, and an opposing second rack gear 140B operably engages with the second jaw assembly 12B. The first rack gear 140A and the second rack gear 140B operably mesh with the primary gear 136 at opposing position along the primary gear 136. The structural configuration between the primary gear 136 and the first and second rack gears 140A, 140B is a rack and pinion mechanism that allows the first and second rack gears 140A, 140B to move linearly via rotation movement by the primary gear 136. In the illustrated embodiment, the first rack gear 140A and the second rack gear 140B are substantially similar to one another and are operably engaged with the first and second jaw assemblies 12A, 12B in mirrored orientations. Inasmuch as the first rack gear 140A and the second rack gear 140B are substantially similar, the following description will relate to the first rack gear 140A. It should be understood, however, that the description of the first rack gear 140A applies equally to the second rack gear 140B.

Referring to FIGS. 6 and 7, the first rack gear 140A has a first end 141A, a second end 141B opposite to the first end 141A, and a longitudinal axis defined therebetween. The first rack gear 140A has linear teeth 142 that extend from the first end 141A towards the second end 141B of the first rack gear 140A. The linear teeth 142 of the first rack gear 140A are adapted to operably mesh with the radial teeth 137 of the primary gear 136 to linearly move the first rack gear 140A along the base 10 while the primary gear 136 rotates, which is described in more detail below.

The first rack gear 140A also defines a set of bores 144 proximate to the second end 141B of the first rack gear 140A positioned away from the linear teeth 142. The first rack gear 140A also defines a threaded bore 145 proximate to the second end 141B of the first rack gear 140A and defined between the set of bores 144. In the illustrated embodiment, the connector 94 and the set of pins 96 (described above) operably engage the first rack gear 140A with the first carrier block 80A of the first jaw assembly 12A via the set of bores 144 and the threaded bore 145 and threaded opening 93 and second set of attachment holes 95.

The structural configuration between the first and second jaw assemblies 12A, 12B and the actuation assembly 14 is considered advantageous at least because the actuation assembly 14 is able to transition the first and second jaw assemblies 12A, 12B upon movement of the first jaw assembly 12A by the drive assembly 16. In other words, any linear, longitudinal movement created on the first jaw assembly 12A by the driving member 14 causes linear, longitudinal movement on the second jaw assembly 12B due to activation of the actuation assembly 14. Such movement of the first and second jaw assemblies 12A, 12B caused by the actuation assembly 14 allows a woodworker to quickly grasp and secure a workpiece between the first and second jaw assemblies 12A, 12B at a central point on said centering device 1. Such centering technology of the centering device 1 allows a woodworker to grasp and secure similar types of workpiece or different types of workpiece with the centering device 1 without rearranging or reorienting said centering device 1 for drilling central holes into the workpiece via a drilling device (e.g., portable drill, drill press, and other drilling devices of the like). Such centering technology of the centering device 1 also allows a woodworker to quickly grasp and grip similar types of workpiece or different types of workpiece with the centering device 1 without constantly bracing the workpiece against a jaw as compared to conventional devices of the like.

As described above, the actuation assembly 14 is a rack and pinion assembly to linearly move the first and second jaw assemblies 12A, 12B. In other exemplary embodiments, any suitable assembly (e.g., translational assemblies, rotational assemblies, combinations of translational and rotational assemblies, or other suitable assemblies) may be used to linearly move first and second jaw assemblies of a centering device. Examples of suitable assemblies to move first and second jaw assemblies include a linkage assembly, a cam assembly, a chain drive assembly, a belt drive assembly, and other suitable assemblies of the like to linearly move first and second jaw assemblies of a centering device. While the actuation assembly 14 is a mechanical assembly to linearly move the first and second jaw assemblies 12A, 12B, any suitable assembly may be used to linearly move first and second jaw assemblies, such as a hydraulic assembly, a pneumatic assembly, an electric assembly, or other similar assemblies of the like.

As illustrated in FIGS. 1 and 1A, the drive assembly 16 operably engages with the base 10 and the first jaw assembly 12A. The drive assembly 16 is able to move the first jaw assembly 12A in a first configuration (see FIGS. 6A and 8C-8D) and in a second configuration (see FIGS. 6B and 8A-8B). The drive assembly 16 is also able to move the second jaw assembly 12B in one or both of the first configuration and the second configuration due to the structural configuration between the first and second jaw assemblies 12A, 12B and the actuation assembly 14. In the illustrated embodiment, the drive assembly 16 is configured to longitudinally move the first jaw assembly 12A along the base 10 and then longitudinally move the second jaw assembly 12B subsequent the movement of the first jaw assembly 12A, via the actuation assembly 14. Such movement created by the drive assembly 16 may occur in one or both of the first configuration and the second configuration to move the first and second jaw assemblies from a disengaged position to an engaged position and vice versa.

Still referring to FIGS. 1 and 1A, the drive assembly 16 includes a driving member 160. The driving member 160 includes a handle 162 that has a first end 162A, a second end 162B opposite to the first end 162A, and a grip 163 extending from the first end 162A towards the second end 162B. The handle 162 defines a slot 164 that extends into the handle 162 from the first end 162A of the handle 162 towards the second end 162B. The handle 162 also defines first and second openings 165A, 165B proximate to the first end 162A of the handle 162. The first and second openings 165A, 165B are coaxial with one another and are in fluid communication with the slot 164. Such uses of the slot 164 and the first and second openings 165A, 165B is described in more detail below.

Still referring to FIGS. 1 and 1A, the driving member 160 includes a screw 166 operably engaged with the handle 162. The screw 166 includes a first end 166A, a second end 166B opposite to the first end 166A, and a longitudinal axis 167 defined therebetween (see FIG. 8C). The screw 166 includes a blanked portion 168 that extends from the second end 166B towards the first end 166A. The blanked portion 168 is sized and configured to be received by the slot 164 of the handle 162 where the blanked portion 168 operably engages with the handle 162 inside of the slot 164, which is described in more detail below. As illustrated in FIG. 1A, the blanked portion 168 defines a transverse passageway 169 proximate the second end 166B of the screw 166. The transverse passageway 169 extends entirely through the screw 166 along an axis orthogonal to the longitudinal axis 167 of the screw 166. A pin 170 operably engages the blanked portion 168 with the handle 162 via the first and second openings 165A, 165A defined by the handle 162 and the transverse passageway 169 defined by the screw 166. Once assembled, the handle 162 is able to rotate and/or hinge about a longitudinal axis of the pin 170 when using the driving member 160.

Still referring to FIGS. 1 and 1A, the screw 166 also includes a threaded portion 172 that extends from the blanked portion 168 towards the first end 166A of the screw 166. Such use of thread portion 172 is described in more detail below. The screw 166 also has an engagement portion 174 that extends from the threaded portion 172 to the first end 166A of the screw 166. The engagement portion 174 is bulbous-shaped in which the engagement portion 174 is sized and configured to operably engage with the first carrier block 80A inside of the bulbous-shaped cavity 90 and the opening 92. Such structural configuration between the engagement portion 174 and the first carrier block 80A allows a woodworker to pivot the screw 166 upwardly and downwardly when transitioning the driving member 160 between the first and second configurations, which is described in more detail below. Such structural configuration between the engagement portion 174 and the first carrier block 80A also allows a woodworker to rotate the engagement portion 174 inside of the first carrier block 80A when the driving member 160 is provided in the first configuration; the first carrier block 80A does not impede or hinder the engagement portion 174 when the driving member 160 is provided in the first configuration.

Still referring to FIGS. 1 and 1A, the drive assembly 16 also includes a half-nut 178 operably engaged with the base 10. Specifically, the half-nut 178 operably engages with the base 10 inside of the passageway 38 defined by the first and second rails 32A, 32B. The half-nut 178 includes a first or left side 178A, an opposing second or right side 178B, a third or top side 178C, and an opposing fourth or bottom side 178D. The half-nut 178 defines a depression 179 that extends into the half-nut 178 from the third side 178C towards the fourth side 178D. Such use and purpose of the depression 179 defined in the half-nut 178 is described in more detail below. Still referring to FIGS. 1 and 1A, a set of connectors 180 operably engages the half-nut 178 with the rail 32 of the base 10 via a set of threaded passageways 181 defined in the half-nut 178 and a set of passages 37A, 37B defined in the first and second extensions 36A, 36B of the first and second rails 32A, 32B.

Referring to FIG. 6A, the half-nut 178 also defines a half-thread 182 proximate the top end 178C of the half-nut 178. The half-thread 182 of the half-nut 178 matches with the threaded portion 172 of the screw 166 to allow the driving member 160 to threadably engaged with the half-nut 178. Upon engagement, the driving member 160 is able to linearly move along the half-nut 178 when a woodworker tightens or loosens the driving member 160 along the half-nut 178 via the matching threads. Such operation of the driving member 160 with the half-nut 178 is described in more detail below.

The structural configuration between the driving member 160 and the half-nut 178 is considered advantageous at least because the driving member 160 may further tighten the first and second jaw assemblies 12A, 12B against a workpiece when the driving member 160 threadably engages with the half-nut 178. As such, a woodworker may tighten or apply a first rotation on the driving member 160 in the first configuration causing the driving member 160 to move linearly towards the front end 20A of the base 10 and moving the first and second jaw assemblies 12A, 12B towards the center of the base 10 via the actuation assembly 14. A woodworker may also loosen or apply an opposing second rotation on the driving member 160 in the first configuration causing the driving member 160 to move linearly back towards the rear end 20B of the base 10 and moving the first and second jaw assemblies 12A, 12B away from the center of the base 10 via the actuation assembly 14. Additionally, the threaded portion 172 of the driving member 160 and half-thread 182 of the half-nut 178 prevents the driving member 160 from backing out of the half-nut 178 once the first and second jaw assemblies 12A, 12B are gripping and securing a workpiece. Moreover, a woodworker of the centering device 1 may move the drive assembly 16 between the first configuration and the second configuration with ease by disengaging and/or reengaging the threaded portion 172 of the screw 166 and the half-thread 182 of the half-nut 178.

Figure 3:
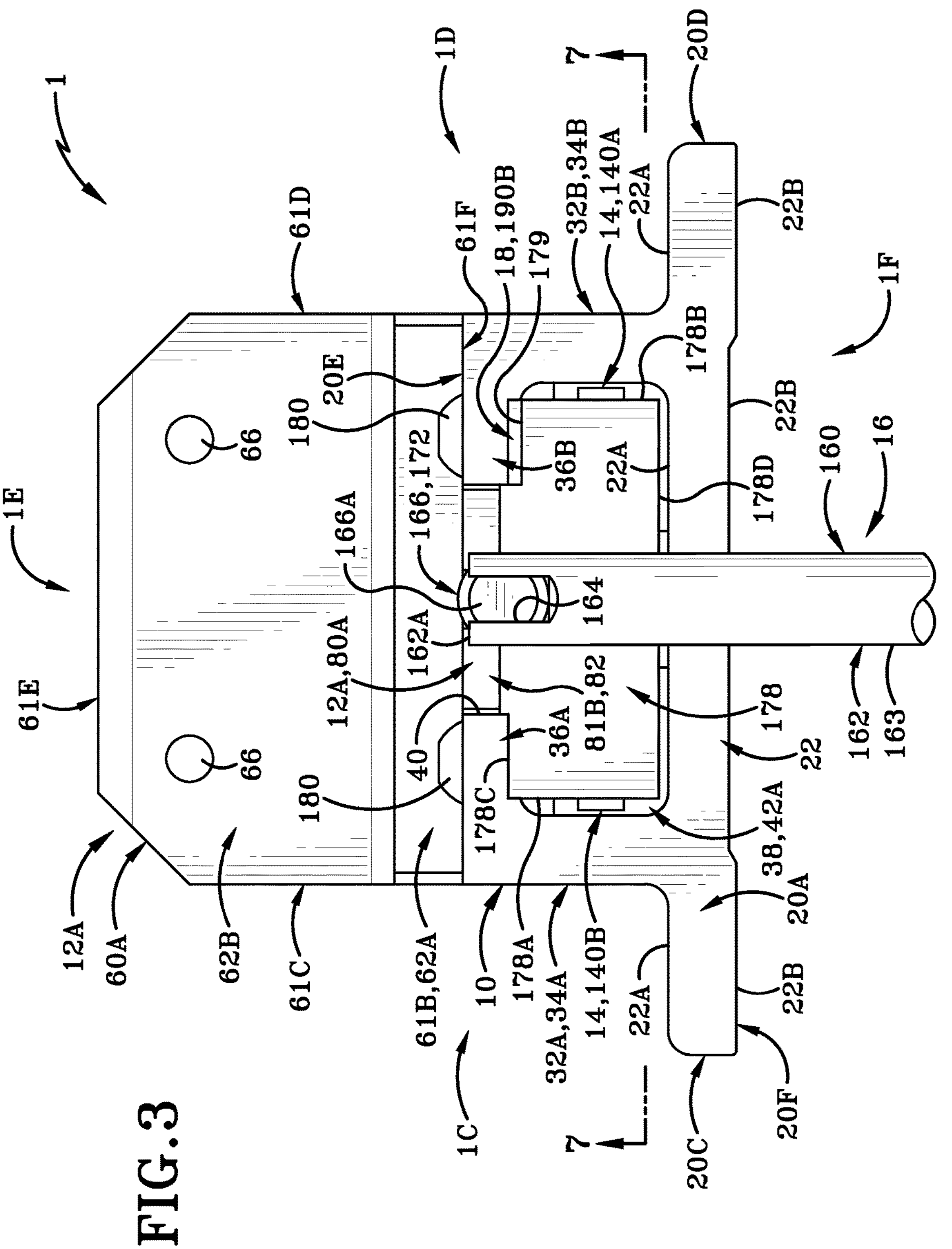
FIG. 3 is a front elevation view of the centering device.
Figure 4:
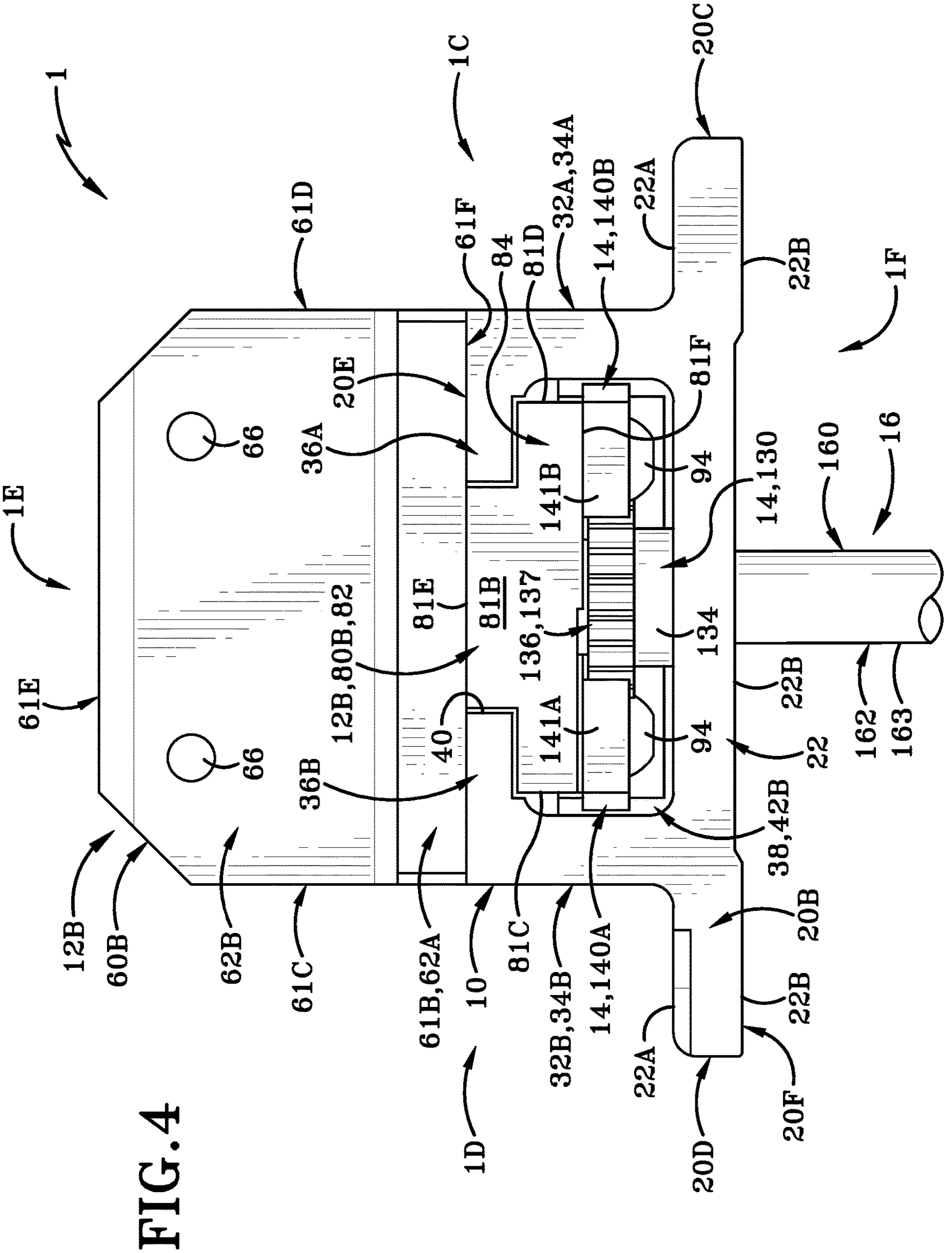
FIG. 4 is a rear elevation view of the centering device.

Referring to FIGS. 1-1A, 3, and 7, the stopper 18 operably engaged with the base 10 and the drive assembly 16 to limit the movement of the first and second jaw assemblies 12A, 12B. As illustrated in FIGS. 1A and 3, the stopper 18 is operably engaged with the first extension 36A of the first rail 32A and with the half-nut 178 inside of the depression 179. The stopper 18 has a first end 190A and a second end 190B opposite to the first end 190A that is disposed at the rear end 20B of the base 20. The stopper 18 includes a mount portion 192 that extends from the second end 190B towards the first end 190A. The mount portion 192 of the stopper 18 is sized and configured to be received by the half-nut 178 inside of the depression 179. The stopper 18 is operably engaged with the second rail 32B and the half-nut 178 by one of the connectors in the set of connectors 180 (see FIGS. 1-1A) via an opening 193 defined in the mount portion 192.

Referring to FIGS. 1-1A and 7, the stopper 18 also includes a leg 194 that extends from the mount portion 192 to the first end 190A of the stopper 18. The leg 194 also extends beyond the half-nut 178 to limit the movement of the first jaw assembly 12A when moving from the engaged position to the disengaged position. The leg 194 also limits the movement of the second jaw assembly 12B when moving from the engaged position to the disengaged position due to the second jaw assembly 12B being dependent upon the movement of the first jaw assembly 12A via the actuation assembly 14. As such, the configuration of the stopper 18 prevents a woodworker from completely backing out the first and second jaw assemblies 12A, 12B from the first and second rails 32A, 32B and disengaging said first and second jaw assemblies 12A, 12B from the base 10 during operation.

In other exemplary embodiments, any suitable number of stoppers may be used to limit movement of one or both of first and second jaw assemblies of centering device.

Having described the structure of the centering device 1 and the various assemblies and connection thereof within centering device 1, method of using thereof will now be described.

Figure 8A:
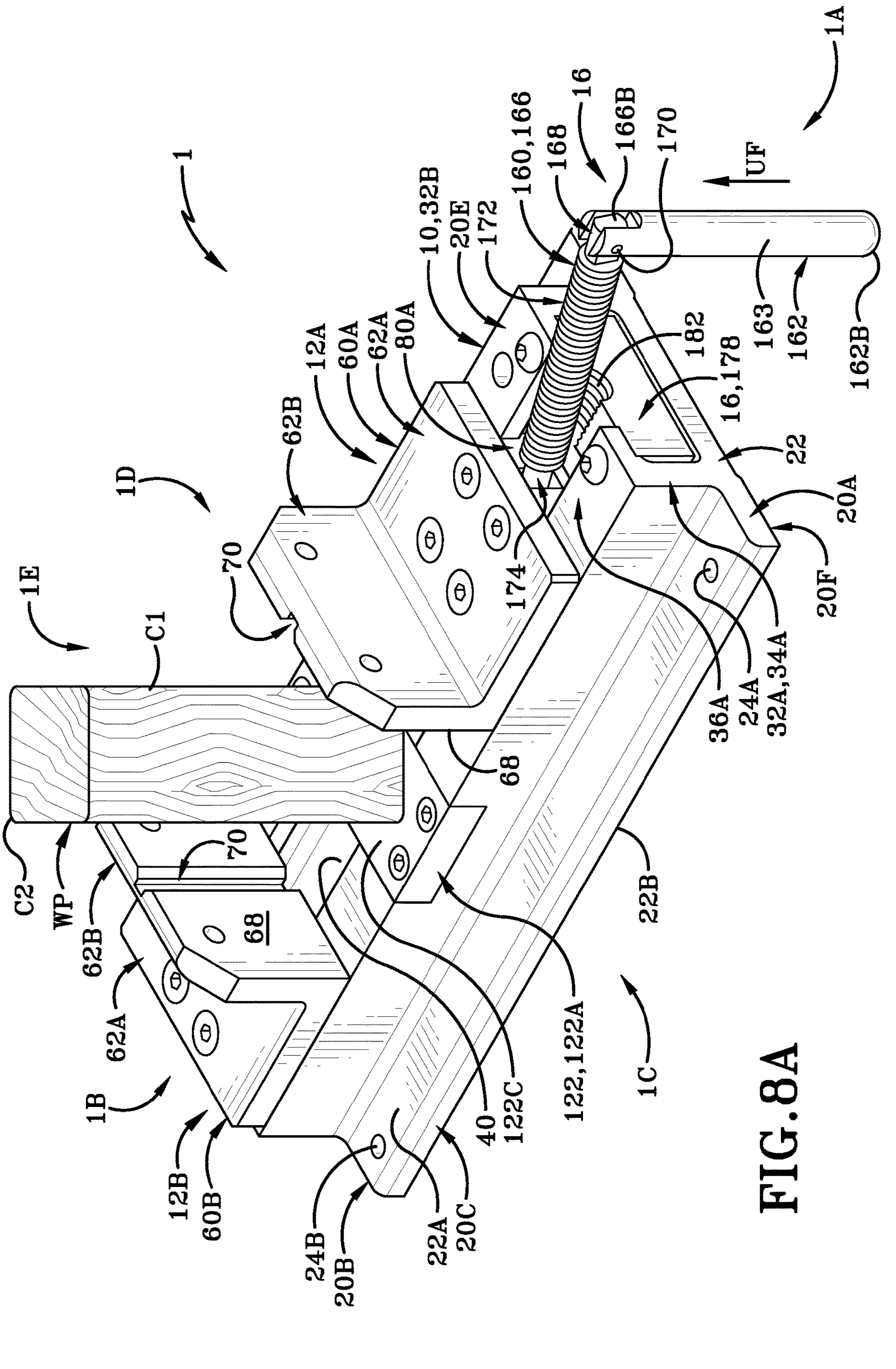
FIG. 8A is an operational view of the centering device, wherein a workpiece is placed between the first and second jaw assemblies, and wherein the driving member is threadably disengaged with the half-nut in the second configuration.
Figure 8B:
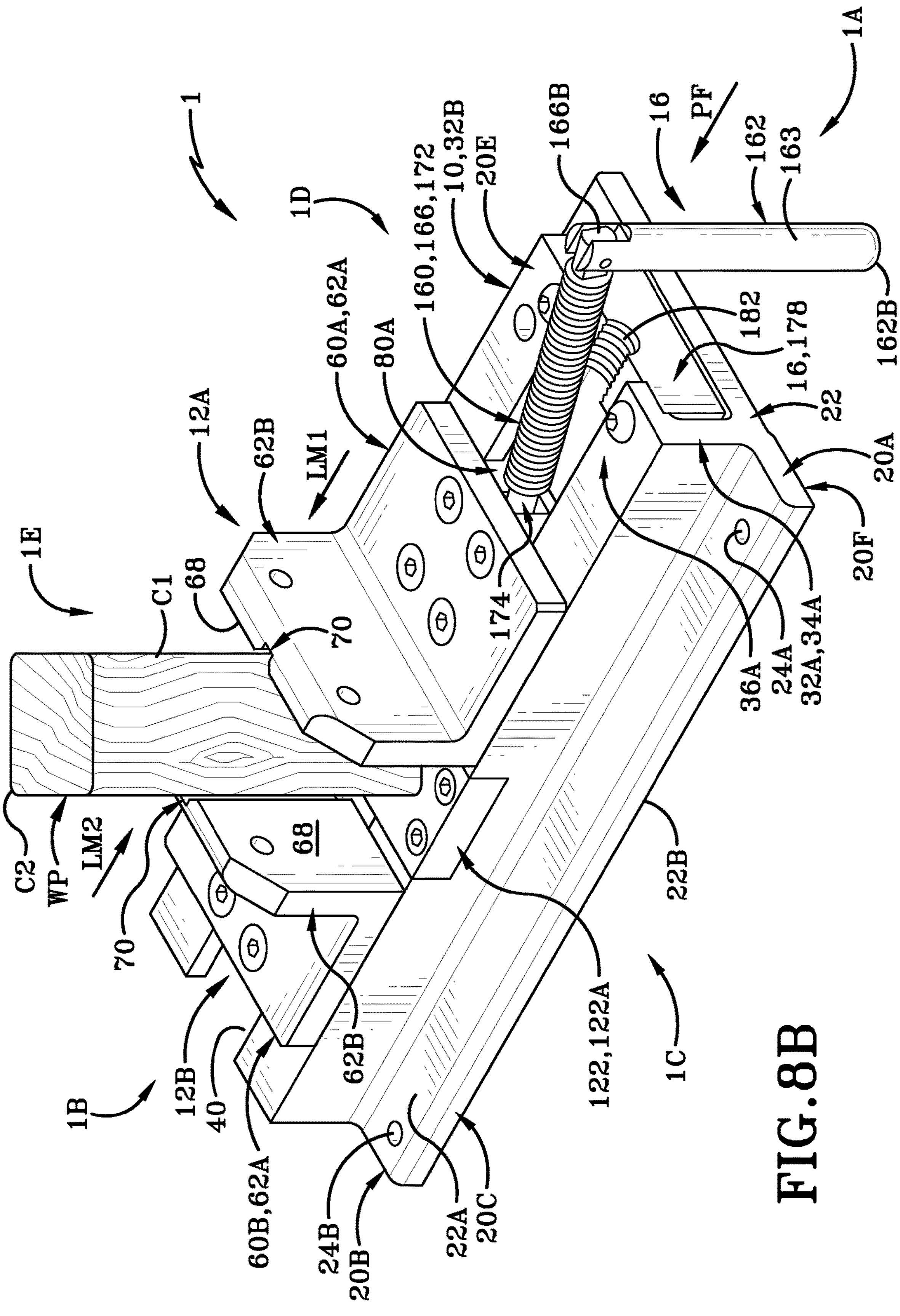
FIG. 8B is another operational view of the centering device similar to FIG. 8A, but the first and second jaw assemblies move towards the workpiece via the actuation assembly and the drive assembly.

Prior to introducing a workpiece, the first and second jaw assemblies 12A, 12B are provided in the disengaged position (see FIG. 8A). In the disengaged position, the first carrier block 80A of the first jaw assembly 12A may be contacting the stopper 18 or proximate to the stopper 18. Due to the actuation assembly 14, the second jaw assembly 12B is also provided in the disengaged position since the position and movement of the second jaw assembly 12A is dependent upon the position and movement of the first jaw assembly 12B; as such, the second carrier block 80B is provided proximate to the front end 20A of the base 10. (see FIG. 2). Additionally, the drive assembly 16 may be provided in the first configuration where the driving member 160 operably engages with the half-nut 178 to prevent movement of the first and second jaw assemblies 12A, 12B; specifically, the threaded portion 172 of the screw 166 is threadably engaged with the half-thread 182 of the half-nut 178 in the first configuration (see FIG. 6A).

As illustrated in FIG. 8A, a woodworker may introduce a workpiece "WP" to the centering device 1. In the illustrated embodiment, the workpiece "WP" has a rectangular cross-section with a plurality of corners. In other exemplary embodiments, a woodworker may introduce different types of workpiece with various cross-sectional shapes for clamping operations.

Once the workpiece "WP" is provided with the centering device 1, the woodworker may then allow the centering device 1 to grasp and secure the workpiece "WP" in a central position on the base 10. As illustrated in FIGS. 6B and 8A, the woodworker may transition the drive assembly 16 from the first configuration to the second configuration. Such transitioning occurs when the woodworker disengages the driving member 160 from the half-nut 178 by exerting an upward force on the handle 162 to quickly move the first and second jaw assemblies 12A, 12B towards the workpiece "WP". The upward force exerted by the woodworker on the handle 162 is denoted by an arrow labeled "UF" in FIGS. 6B and 8A. During this disengagement, the engagement portion 174 pivots upwardly inside of the first carrier block 80A to allow the driving member 160 to disengage from the half-nut 178. The first jaw 60A does limit the upward movement of the driving member 160 given that the engagement member 174 is enclosed between the first jaw 60A and the first carrier block 80A. During this disengagement, the threaded portion 172 of the screw 166 also threadably disengages from the half-nut 178 which allows the driving member 160 to move towards front end 20A of the base 10 without the assistance of the half-nut 178. In one instance, the woodworker may leave the drive assembly 16 in the first configuration and tighten the driving member 160 into the half-nut 178 to move the first and second jaw assemblies 12A, 12B towards the workpiece "WP". However, in this instance, this may incur more time given the dimensions of the workpiece "WP" illustrated in FIGS. 8A-9.

Once disengaged, the woodworker may then exert a pushing force against the handle 162 in a direction towards the front end 1A of the centering device 1 to quickly move the first and second jaw assemblies 12A, 12B towards the workpiece "WP". The pushing force exerted by the woodworker on the handle 162 is denoted by an arrow labeled "PF" in FIG. 8B. With this pushing force, the first jaw assembly 12A travels away from the rear end 20B of the base 20 towards the bridge 122 in a first direction. The first rack gear 140A of the actuation assembly 14 also linearly travels away from the rear end 20B of the base 20 towards the bridge 122 in the same direction due to the structural configuration between the first rack gear 140A and the first carrier block 80A of the first jaw assembly 12A. The linear movement of the first jaw assembly 12A and the first rack gear 140A is denoted by a double arrow labeled "LM1" in FIG. 7. As the first rack gear 140A moves in the first direction towards the bridge 122, the first rack gear 140A meshes with the primary gear 136 causing the primary gear 136 to rotate in a first direction about the longitudinal axis 135 of the support rod 134. Such rotation of the primary gear 136 is denoted by an arrow labeled "R" in FIG. 7.

As the primary gear 136 rotates with the linear movement of the first rack gear 140A, the primary gear 136 linearly moves the second rack gear 140B of the actuation assembly 14 subsequent to the linear movement of the first rack gear 140A. As illustrated in FIG. 7, the primary gear 136 linearly moves the second rack gear 140B away from the front end 20A of the base 20 towards the bridge 122 in an opposing second direction due to the structural configuration of the actuation assembly 14. Upon this linear movement, the second jaw assembly 12A also travels away from the front end 20A of the base 20 towards the bridge 122 via the structural configuration between the second rack gear 140B and the second carrier block 80B of the second jaw assembly 12B. The linear movement of the second jaw assembly 12B and the second rack gear 140B is denoted by a double arrow labeled "LM2" in FIG. 7. The pushing force exerted by the woodworker against the driving member 160 may cease once the first jaw 60A and the second jaw 60B operably engage with the workpiece "WP" and first and second corners "C1", "C2" of the workpiece "WP" are disposed inside of the grooves 70 of the first and second jaws 60A, 60B.

Figure 8C:
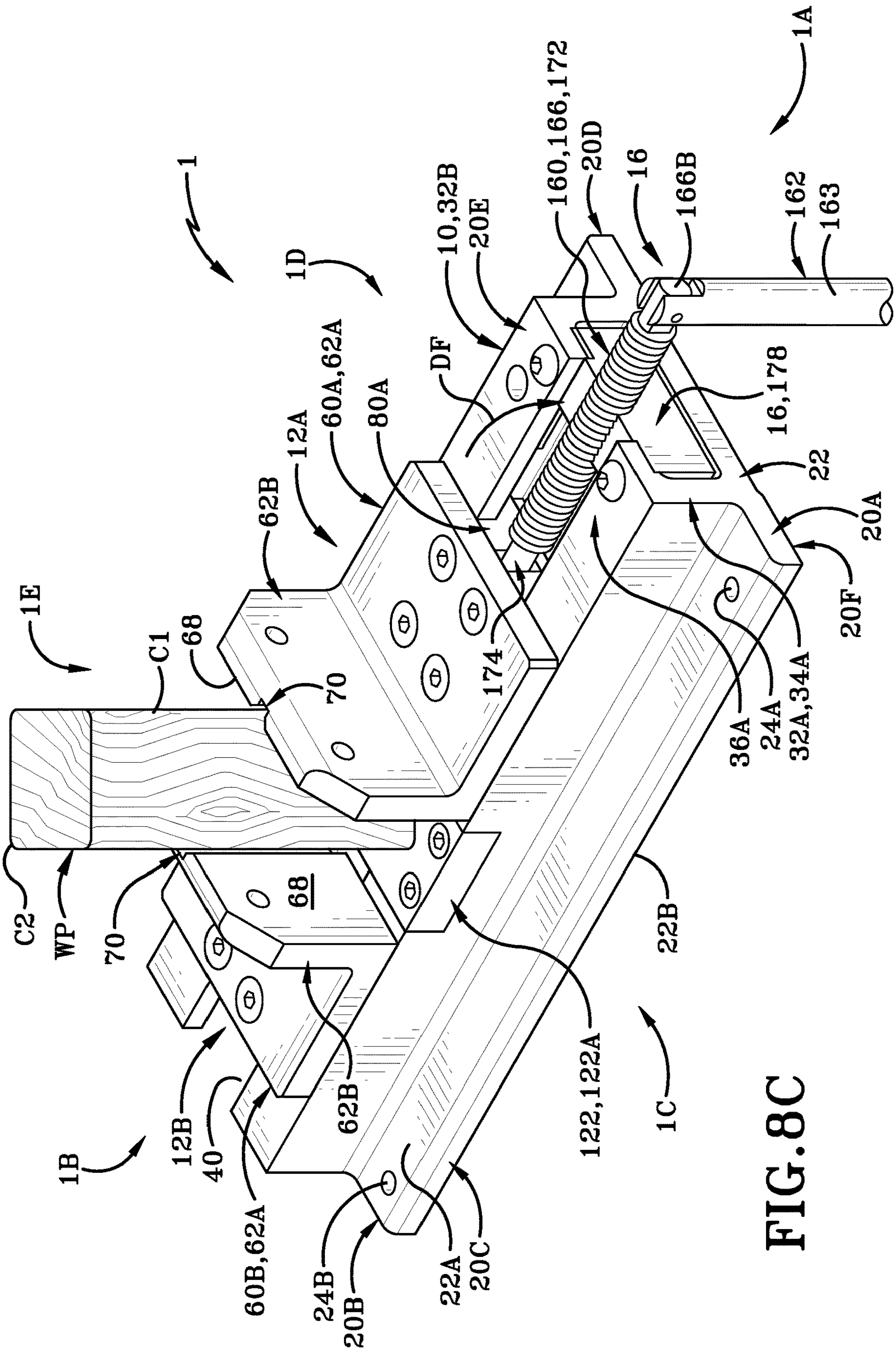
FIG. 8C is another operational view of the centering device similar to FIG. 8B, but the first and second jaw assemblies contact the workpiece, and wherein the driving member is threadably engaged with the half-nut in the first configuration.

Once the pushing force ceases, the woodworker may then transition the drive assembly 16 from the second configuration back to the first configuration where the driving member 160 operably reengage with the half-nut 178. As illustrated in FIG. 8C, the woodworker may reengage the driving member 160 with the half-nut 178 by exerting a downward force on the handle 162 to maintain the positions of the first and second jaw assemblies 12A, 12B relative to the workpiece "WP". The downward force exerted by the woodworker on the handle 162 is denoted by an arrow labeled "DF" in FIG. 8C. Here, the drive assembly 16 is provided in the first configuration where the thread engagement between the driving member 160 and the half-nut 178 prevents the backing up of either the first jaw assembly 12A or the second jaw assembly 12B.

Figure 8D:
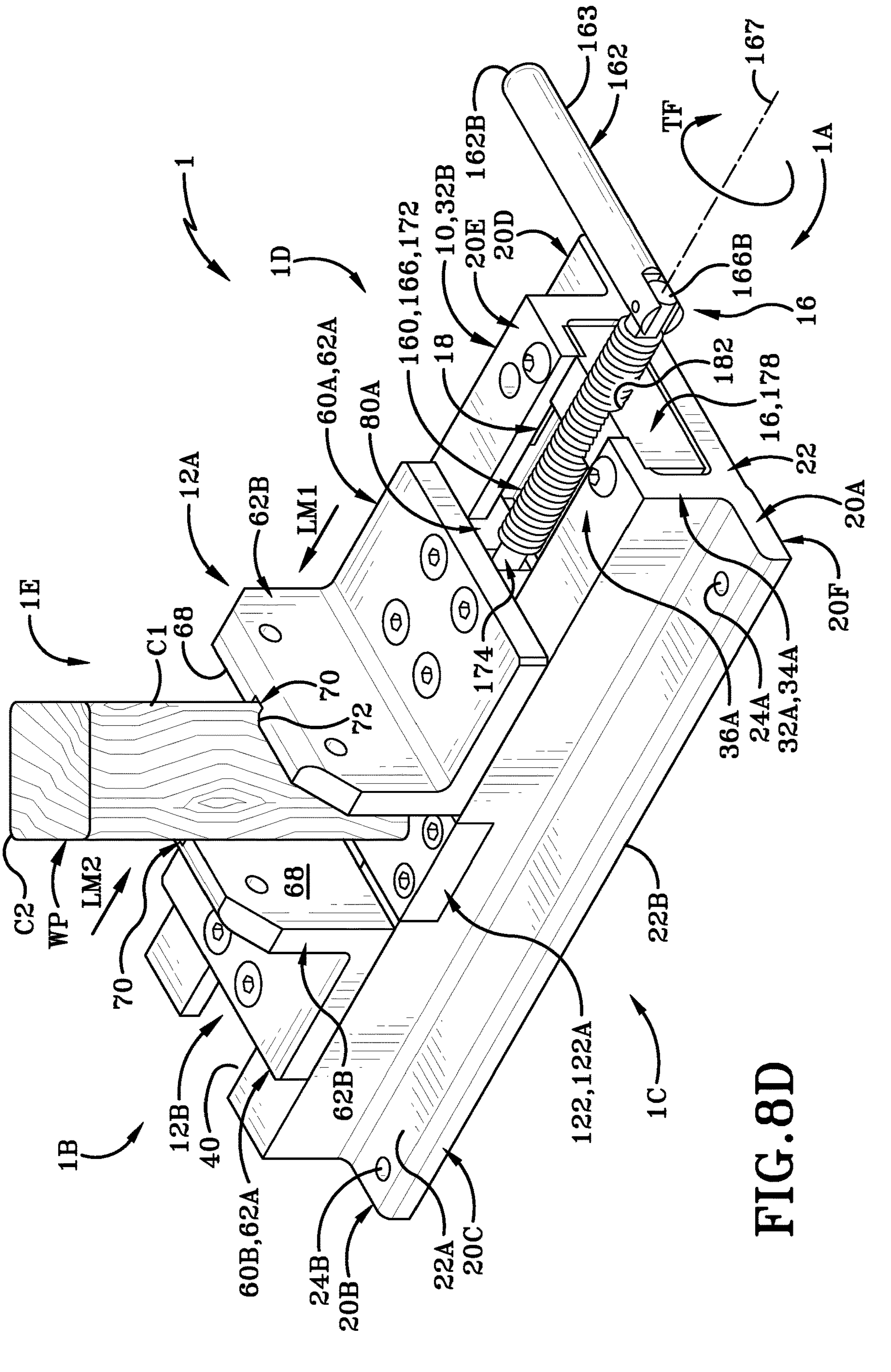
FIG. 8D is another operation view of the centering device similar to FIG. 8C, but the first and second jaw assemblies are tightened against the workpiece via the actuation assembly and the drive assembly.

Once provided in the first configuration, the first and second jaw assemblies 12A, 12B may be tightened and/or secured against the workpiece "WP" at opposing side to maintain said workpiece "WP" on the base 10. As illustrated in FIG. 8D, the woodworker may turn the handle of the driving member 160 in a first tightening direction to further tighten screw 166 with the half-nut 178 causing the first and second jaw assemblies 12A, 12B to tighten against the workpiece "WP". The turning motion created by the woodworker on the handle 162 of the driving member 160 is denoted by an arrow labeled "T" in FIG. 8D. The woodworker may continue to tighten the driving member 160 against the half-nut 178 in the first tightening direction until the chamfered edges 72 of the first and second jaws 60A, 60B operably engaged with the first and second corners "C1", "C2" of the workpiece "WP" where the first and second jaws 60A, 60B impede rotation or movement of the workpiece "WP" along the jaw surfaces 68 of said first and second jaws 60A, 60B (see FIG. 9). The woodworker may then introduce a drilling device to drill or bore a hole into the workpiece "WP".

Once the drilling process or woodworking process is complete, the woodworker may remove the drilled workpiece from the centering device 1 by loosening the driving member 160 from the half-nut 178 until the drilled workpiece "WP" is free from engaging the first and second jaws 60A, 60B. In this situation, the drive assembly 16 would linearly move the first and second jaw assemblies 12A, 12B in a reverse direction away from one another until the drilled workpiece is free from engaging the first and second jaws 60A, 60B. The woodworker may also remove the drilled workpiece from the centering device 1 by threadably disengaging the screw 166 from the half-nut 178 and pulling the driving member 160 away from the drilled workpiece until the drilled workpiece is free from engaging the first and second jaws 60A, 60B. In this situation, drive assembly 16 would also linearly move the first and second jaw assemblies 12A, 12B in a reverse direction away from one another until the drilled workpiece is free from engaging the first and second jaws 60A, 60B; here, the disengagement of the screw 166 from the half-nut 178 may be quicker than loosening the driving member 160 from the half-nut 178.

Figure 10:
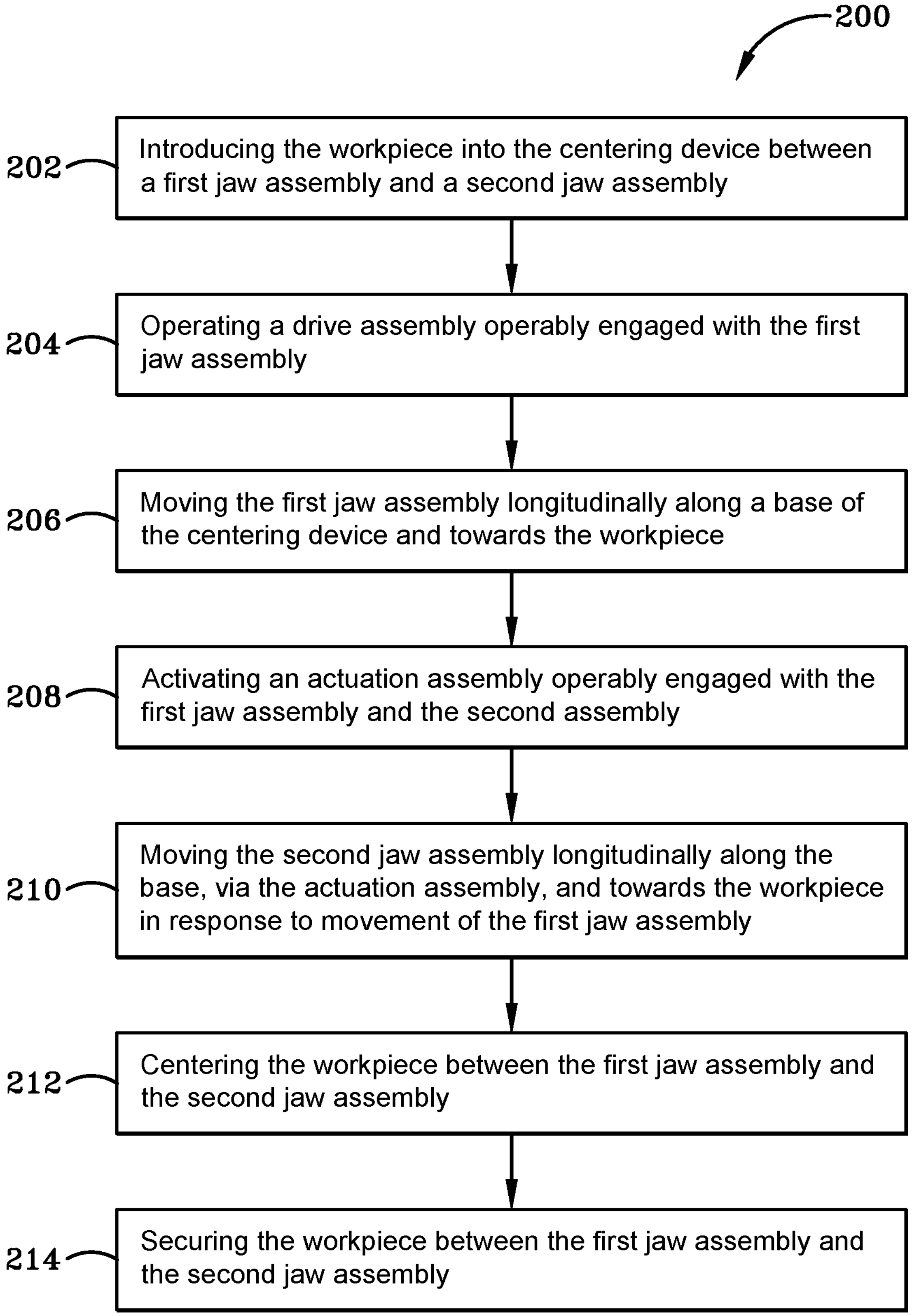
FIG. 10 is a method flowchart for centering a workpiece with a centering device.

FIG. 10 illustrates a method 200 of centering a workpiece with a centering device. An initial step 202 of the method 200 comprises introducing the workpiece into the centering device between a first jaw assembly and a second jaw assembly. Another step 204 comprises operating a drive assembly operably engaged with the first jaw assembly. Another step 206 comprises moving the first jaw assembly longitudinally along a base of the centering device and towards the workpiece. Another step 208 comprises activating an actuation assembly operably engaged with the first jaw assembly and the second assembly. Another step 210 comprises moving the second jaw assembly longitudinally along the base, via the actuation assembly, and towards the workpiece in response to movement of the first jaw assembly. Another step 212 centering the workpiece between the first jaw assembly and the second jaw assembly. Another step 214 comprises securing the workpiece between the first jaw assembly and the second jaw assembly.

In an exemplary embodiment, method 200 may include additional steps of centering a workpiece with a centering device. An optional step may include that the step of moving the second jaw assembly longitudinally along the base further comprises moving a first rack gear of the actuation assembly in a first direction; and moving a second rack gear of the actuation assembly, via a primary gear, in a second direction opposed to the first direction in response to movement of the first rack gear. An optional step may further comprise limiting travel of one of the first jaw assembly and the second jaw along the base, via a stopper. An optional step may further include that the step of operating the drive assembly includes selecting to position the drive assembly in one of a first configuration and a second configuration. An optional step may further include that the drive assembly is positioned in the first configuration, and the method further comprises rotating a driving member of the drive assembly relative to a half-nut of the drive assembly. An optional step may further include that the drive assembly is positioned in the second configuration, and the method further comprises linearly moving a driving member of the drive assembly relative to a half-nut of the drive assembly. Optional steps further comprise moving the driving member towards the workpiece until the first jaw assembly and the second jaw assembly engage the workpiece; positioning the drive assembly in the first configuration; threadably engaging the driving member with the half-nut; and rotating the driving member of the drive assembly relative to the half-nut of the drive assembly. Optional steps further comprise that the step of centering the workpiece between the first jaw assembly and the second jaw assembly further comprises defining a first groove in a first jaw surface of a first jaw of the first jaw assembly; defining a second groove in a second jaw surface of a second jaw of the first jaw assembly; opposing the first jaw surface and the second jaw surface; engaging a first corner of the workpiece in the first groove; and engaging a second corner of the workpiece in the second groove.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A centering device, comprising:

a base having a pair of rails;

a first jaw assembly operably engaged with the base, wherein the first jaw assembly is configured to move longitudinally along extensions of the pair of rails of the base;

a second jaw assembly operably engaged with the base, wherein the second jaw assembly is opposed to the first jaw assembly, and wherein the second jaw assembly is configured to move longitudinally along the extensions of the pair of rails of the base;

an actuation assembly operably engaged with the base, the first jaw assembly, and the second jaw assembly; and a drive assembly operably engaged with the first jaw assembly, the drive assembly having:

a half-nut operably engaged with and positioned inside of a chamber defined between uprights of the pair of rails of the base and vertically below the extensions of the pair of rails that extend outwardly from the uprights; and a driving member operably engaged with the first jaw assembly and operably engageable with the half-nut inside of the base;

wherein the drive assembly is operable to move the first jaw assembly longitudinally along the base;

wherein the movement of the first jaw assembly longitudinally along the pair of rails of the base activates the actuation assembly; and wherein the second jaw assembly is caused to move longitudinally along the pair of rails of the base via the actuation assembly.

2. The centering device of claim 1, wherein the first jaw assembly and the second jaw assembly are configured to move one of towards one another and away from one another.

3. The centering device of claim 1, wherein the drive assembly is operable in one of a first configuration and a second configuration to move the first jaw assembly longitudinally along the base.

4. The centering device of claim 3, wherein when the drive assembly is in the first configuration, the drive assembly rotates to move the first jaw assembly longitudinally along the base, and when the drive assembly is in the second configuration, the drive assembly moves linearly to move the first jaw assembly longitudinal along the base.

5. The centering device of claim 1, wherein when the driving member is in a first configuration and is threadably engaged with the half nut, the driving member is rotated to move the first jaw assembly longitudinally along the base; and wherein when the driving member is in a second configuration and is threadably disengaged from the half nut, the driving member is moved linearly to move the first jaw assembly longitudinally along the base.

6. The centering device of claim 1, further comprising:

a stopper operably engaged with the base and the drive assembly, wherein the stopper is configured to limit the movement of one or both of first jaw assembly and the second jaw assembly.

7. The centering device of claim 1, wherein the actuation assembly comprises:

a primary gear; and a first rack gear operably engaged with the first jaw assembly, wherein the first rack gear and the primary gear mesh with one another and enable the primary gear to move the first jaw assembly linearly and longitudinally along the base.

8. The centering device of claim 7, further comprising:

a bridge operably engaged with the base between the first jaw assembly and the second jaw assembly.

9. The centering device of claim 8, wherein the primary gear is operably engaged with the bridge.

10. The centering device of claim 7, wherein the actuation assembly further comprises:

a second rack gear operably engaged with the second jaw assembly, wherein the second rack gear and the primary gear mesh with one another to enable the primary gear to linearly move the second jaw assembly longitudinally along the base, and wherein the movement of the second rack gear is dependent upon the movement of the first rack gear.

11. The centering device of claim 1, the first jaw assembly comprises:

a first jaw; and a first carrier block operably engaged with the first jaw, wherein the first carrier block is configured to operably engage the first jaw with the actuation assembly and the drive assembly.

12. The centering device of claim 11, wherein the base includes:

a channel defined between the pair of rails; and said chamber being located vertically below the channel and in fluid communication with the channel; and wherein the first carrier block includes:

a top portion operably engaged with the first jaw, wherein the top portion is positioned inside the channel; and a bottom portion extending from the top portion and operably engaged with the actuation assembly, wherein the bottom portion is positioned inside the chamber defined by the base.

13. The centering device of claim 12, wherein the second jaw assembly comprises:

a second jaw; and a second carrier block, wherein the second carrier block includes an upper portion operably engaged with the second jaw and located within the channel of the base, and a lower portion operably engaged with the actuation assembly and located within the chamber.

14. The centering device of claim 11, wherein the first jaw assembly further comprises a cavity defined in the first carrier block;

wherein the drive assembly includes an engagement portion, and wherein the engagement portion is received within the cavity.

15. The centering device of claim 1, wherein the first jaw assembly includes a first jaw having a first jaw surface;

wherein the second jaw assembly includes a second jaw having a second jaw surface;

wherein the first jaw surface is opposed to the second jaw surface; and wherein the first jaw surface and the second jaw surface are adapted to simultaneously engage a workpiece located therebetween.

16. The centering device of claim 15, further comprising:

a first groove defined in the first jaw surface, a second groove defined in the second jaw surface; and wherein the first groove is configured to house a first corner of the workpiece and the second groove is configured to house a second corner of the workpiece.

17. A method of centering a workpiece with a centering device; the method comprising steps of:

introducing the workpiece into the centering device between a first jaw assembly and a second jaw assembly;

operating a drive assembly operably engaged with the first jaw assembly, the drive assembly having a half-nut operably engaged with and positioned inside of a chamber defined between uprights of the pair of rails of the base and vertically below extensions of the pair of rail that extend outwardly from the uprights, and a driving member operably engaged with the first jaw assembly and operably engageable with the half-nut inside of the base;

moving the first jaw assembly longitudinally along the extensions of the pair of rails of the base of the centering device and towards the workpiece;

activating an actuation assembly operably engaged with the first jaw assembly and the second assembly;

moving the second jaw assembly longitudinally along the extensions of the pair of rails of the base, via the actuation assembly, and towards the workpiece in response to movement of the first jaw assembly;

centering the workpiece between the first jaw assembly and the second jaw assembly; and securing the workpiece between the first jaw assembly and the second jaw assembly.

18. The method of claim 17, wherein moving the second jaw assembly longitudinally along the base further comprises:

moving a first rack gear of the actuation assembly in a first direction; and moving a second rack gear of the actuation assembly, via a primary gear, in a second direction opposed to the first direction in response to movement of the first rack gear.

19. The method of claim 17, further comprising:

limiting travel of one of the first jaw assembly and the second jaw along the base, via a stopper.

20. The method of claim 17, wherein operating the drive assembly includes selecting to position the drive assembly in one of a first configuration and a second configuration.

21. The method of claim 20, wherein the drive assembly is positioned in the first configuration, and the method further comprises:

rotating the driving member of the drive assembly relative to the half-nut of the drive assembly.

22. The method of claim 21, wherein the drive assembly is positioned in the second configuration, and the method further comprises:

linearly moving the driving member of the drive assembly relative to the half-nut of the drive assembly.

23. The method of claim 22, further comprising:

moving the driving member towards the workpiece until the first jaw assembly and the second jaw assembly engage the workpiece;

positioning the drive assembly in the first configuration;

threadably engaging the driving member with the half-nut; and rotating the driving member of the drive assembly relative to the half-nut of the drive assembly.

24. The method of claim 17, wherein centering the workpiece between the first jaw assembly and the second jaw assembly further comprises:

defining a first groove in a first jaw surface of a first jaw of the first jaw assembly;

defining a second groove in a second jaw surface of a second jaw of the first jaw assembly;

opposing the first jaw surface and the second jaw surface;

engaging a first corner of the workpiece in the first groove; and engaging a second corner of the workpiece in the second groove.

* * * * *